US006783137B2

(12) United States Patent
Nagreski et al.

(10) Patent No.: US 6,783,137 B2
(45) Date of Patent: Aug. 31, 2004

(54) STEERING KNUCKLE CARRIER-TO-SUSPENSION ARM PIVOTAL CONNECTION AND METHOD OF ASSEMBLING AND PRELOADING THE PIVOTAL CONNECTION

(75) Inventors: David L. Nagreski, West Lafayette, IN (US); Dean F. Bartolone, Lafayette, IN (US)

(73) Assignee: Tuthill Corporation, Burr Ridge, IL (US)

( * ) Notice: Subject to any disclaimer, the term of this patent is extended or adjusted under 35 U.S.C. 154(b) by 131 days.

(21) Appl. No.: 10/294,099

(22) Filed: Nov. 14, 2002

(65) Prior Publication Data

US 2004/0094927 A1 May 20, 2004

(51) Int. Cl.[7] .................................................. B62D 7/18
(52) U.S. Cl. ........................... 280/93.512; 280/124.135
(58) Field of Search ....................... 280/93.512, 93.511, 280/124.134, 124.135, 124.136; 403/151, 154, 155

(56) References Cited

U.S. PATENT DOCUMENTS

| | | | | |
|---|---|---|---|---|
| 2,094,945 A | * | 10/1937 | Hesselrode | ............ 280/93.512 |
| 2,580,559 A | | 1/1952 | Kolbe | |
| 4,271,922 A | | 6/1981 | Kishline | |
| 4,798,394 A | * | 1/1989 | Pollock et al. | ......... 280/93.512 |
| 4,878,683 A | * | 11/1989 | Dever | ........................ 180/253 |
| 5,348,337 A | * | 9/1994 | Ando | .................. 280/124.143 |
| 5,401,049 A | | 3/1995 | Richardson | |
| 5,873,587 A | | 2/1999 | Kawabe et al. | |
| 5,938,219 A | | 8/1999 | Hayami et al. | |
| 6,116,626 A | | 9/2000 | Cherry et al. | |
| 6,139,190 A | | 10/2000 | Provence | |
| 6,296,264 B1 | | 10/2001 | Wimmer | |
| 2003/0011160 A1 | * | 1/2003 | Bodin | ................... 280/93.512 |

FOREIGN PATENT DOCUMENTS

| EP | 0 806 310 A2 | 11/1997 |
|---|---|---|
| GB | 2 049 576 A | 12/1980 |

OTHER PUBLICATIONS

Dana/Kirkstall Specialty Axle Division, Feb. 1998, IFS 84 Service Manual (5 pages).

* cited by examiner

*Primary Examiner*—David Dunn
(74) *Attorney, Agent, or Firm*—George Pappas

(57) ABSTRACT

A pivotal connection includes a pin through a bore in a carrier having an annular flange and annular groove at opposite ends, and opposing annular bearings having relative rotatable components fitted around the pin within the bore and abutting opposite sides of an annular member in the bore such that the pin is rotatable relative to the carrier. One bearing abuts a side of the flange and the other bearing is spaced from the groove so as to define an annular gap extending from the groove to the other bearing. The pivotal connection also includes a retainer member disposed in the groove and projecting therefrom and spaced by the gap from the other bearing and a series of shims and spacer positioned around the pin between the retainer member and other bearing so as to fill the gap to impose a predetermined preload on the bearings causing them to clamp therebetween the annular member in the carrier bore.

26 Claims, 24 Drawing Sheets

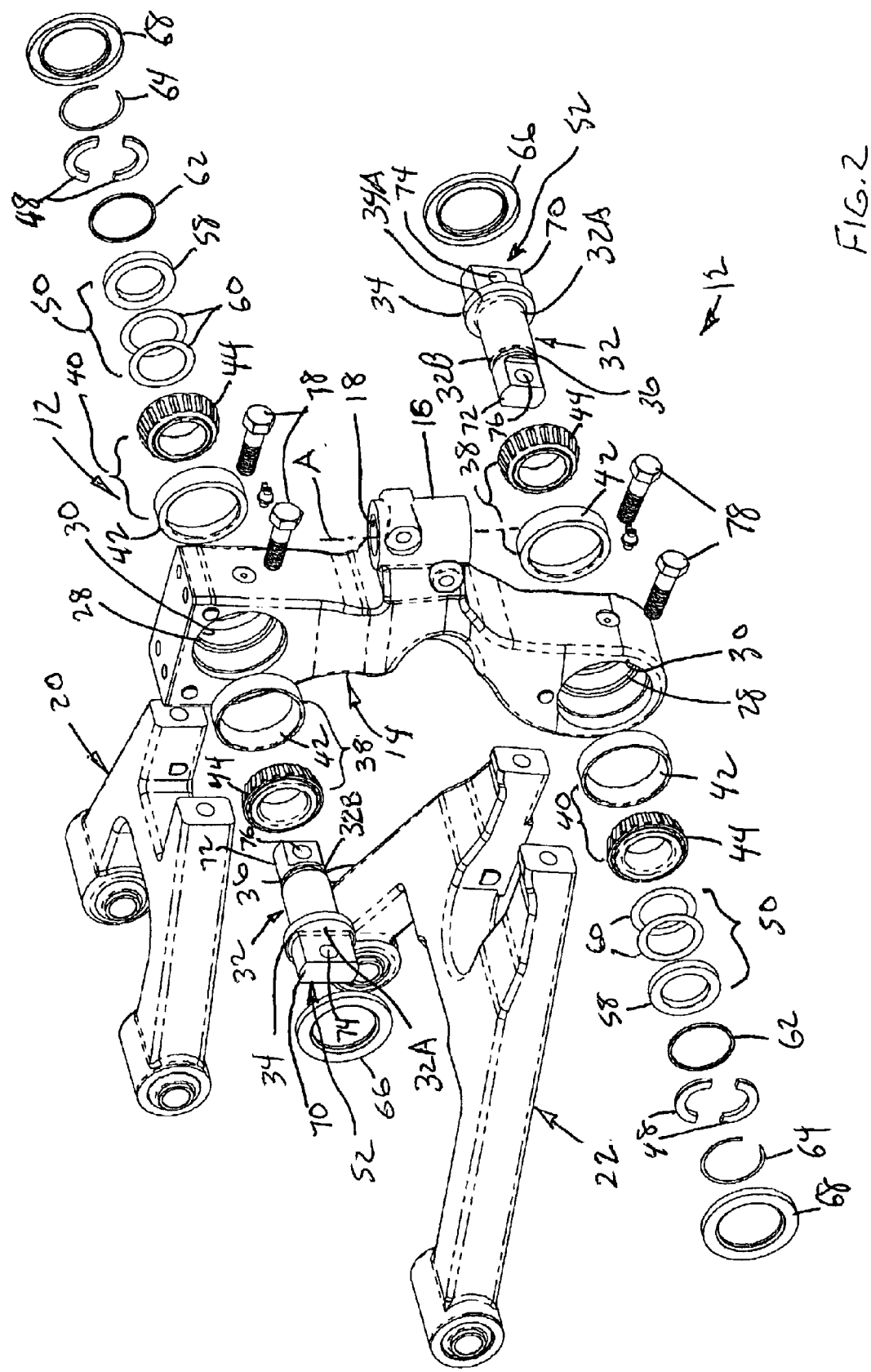

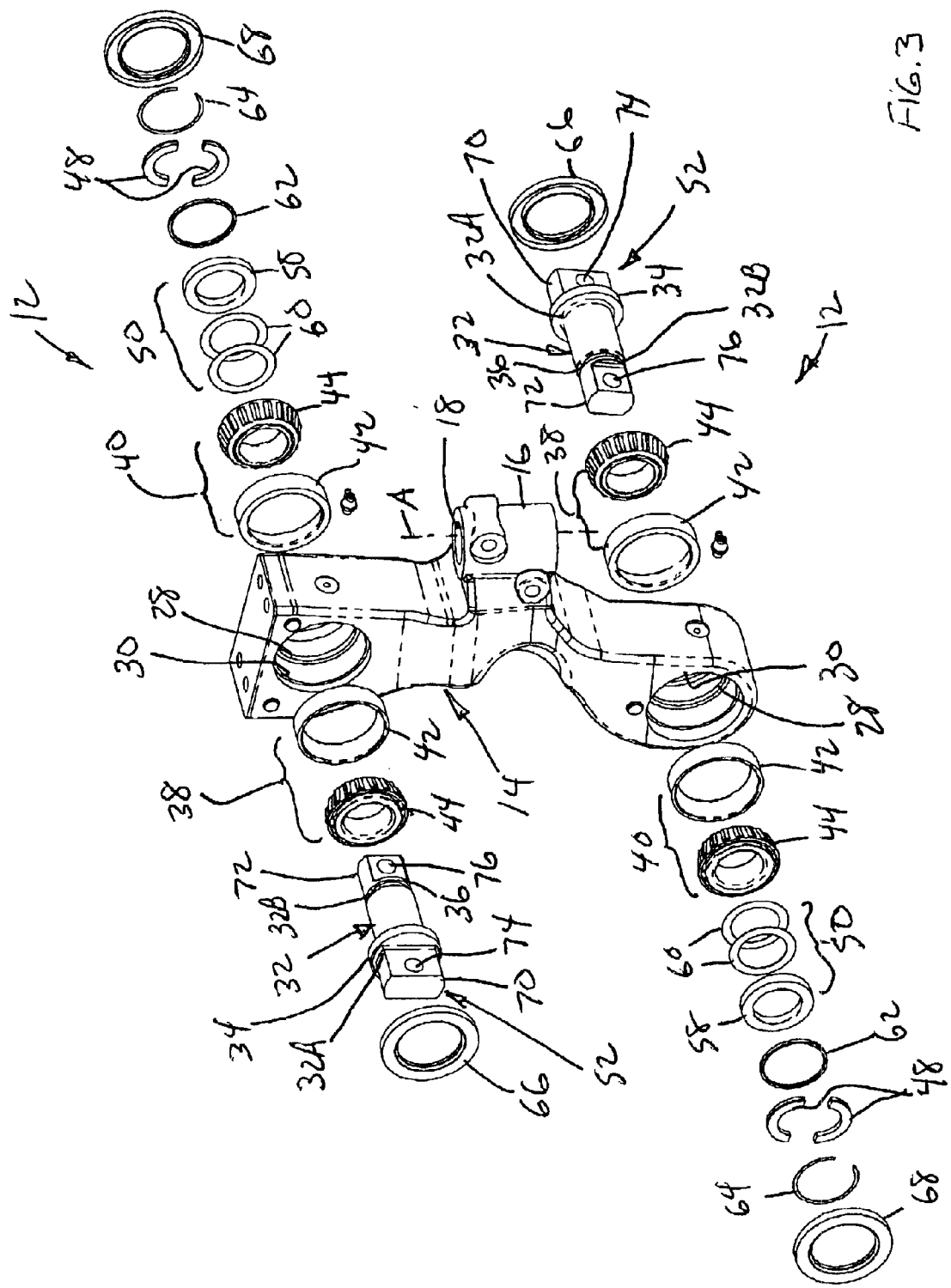

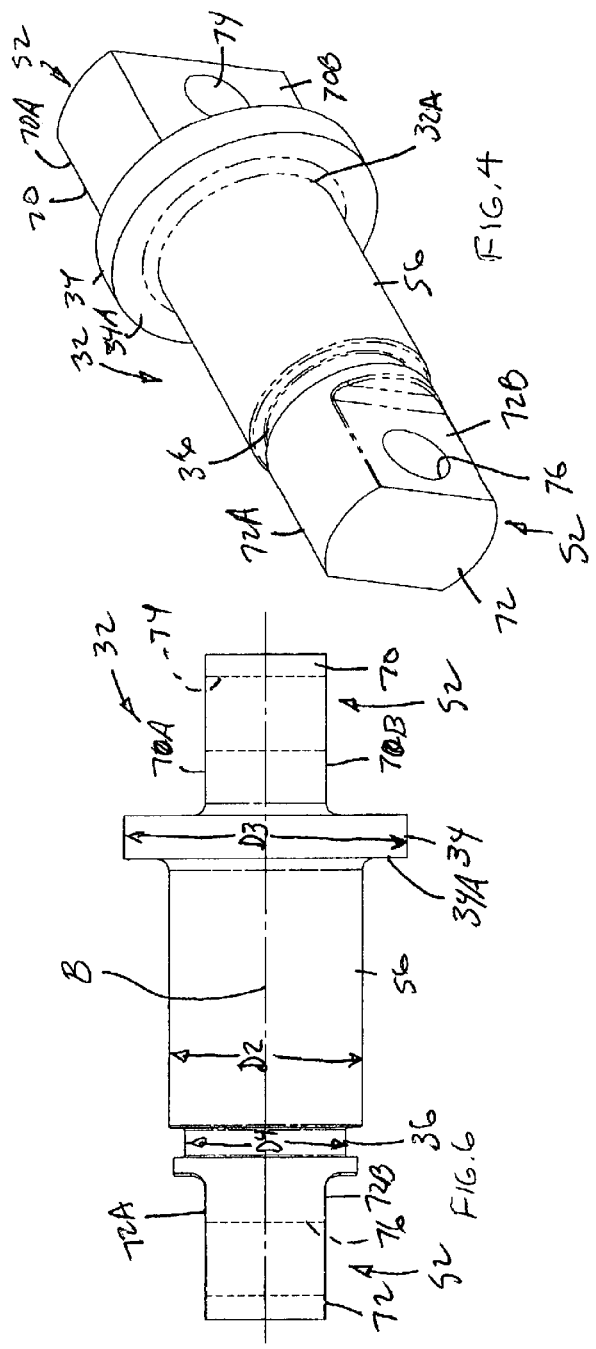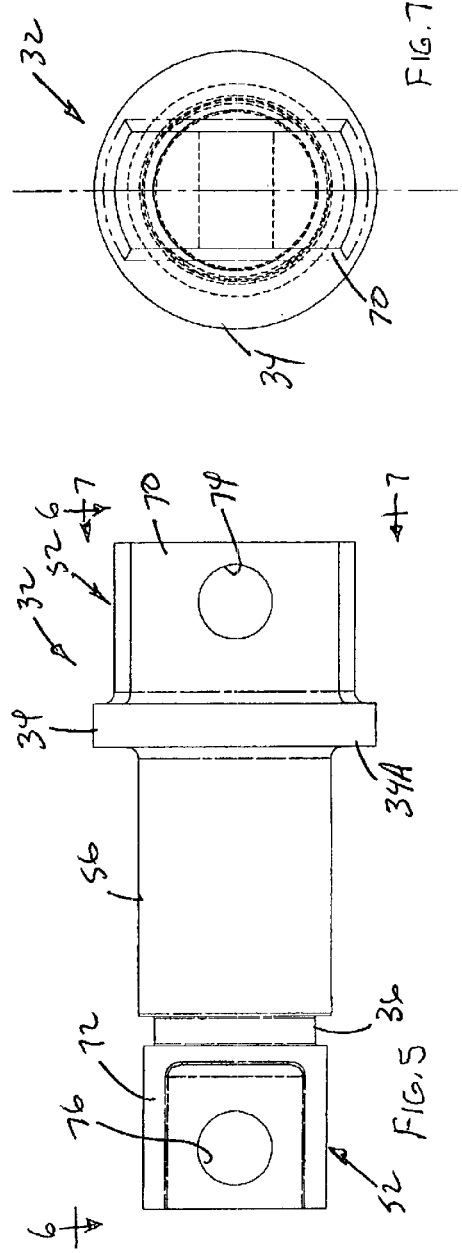

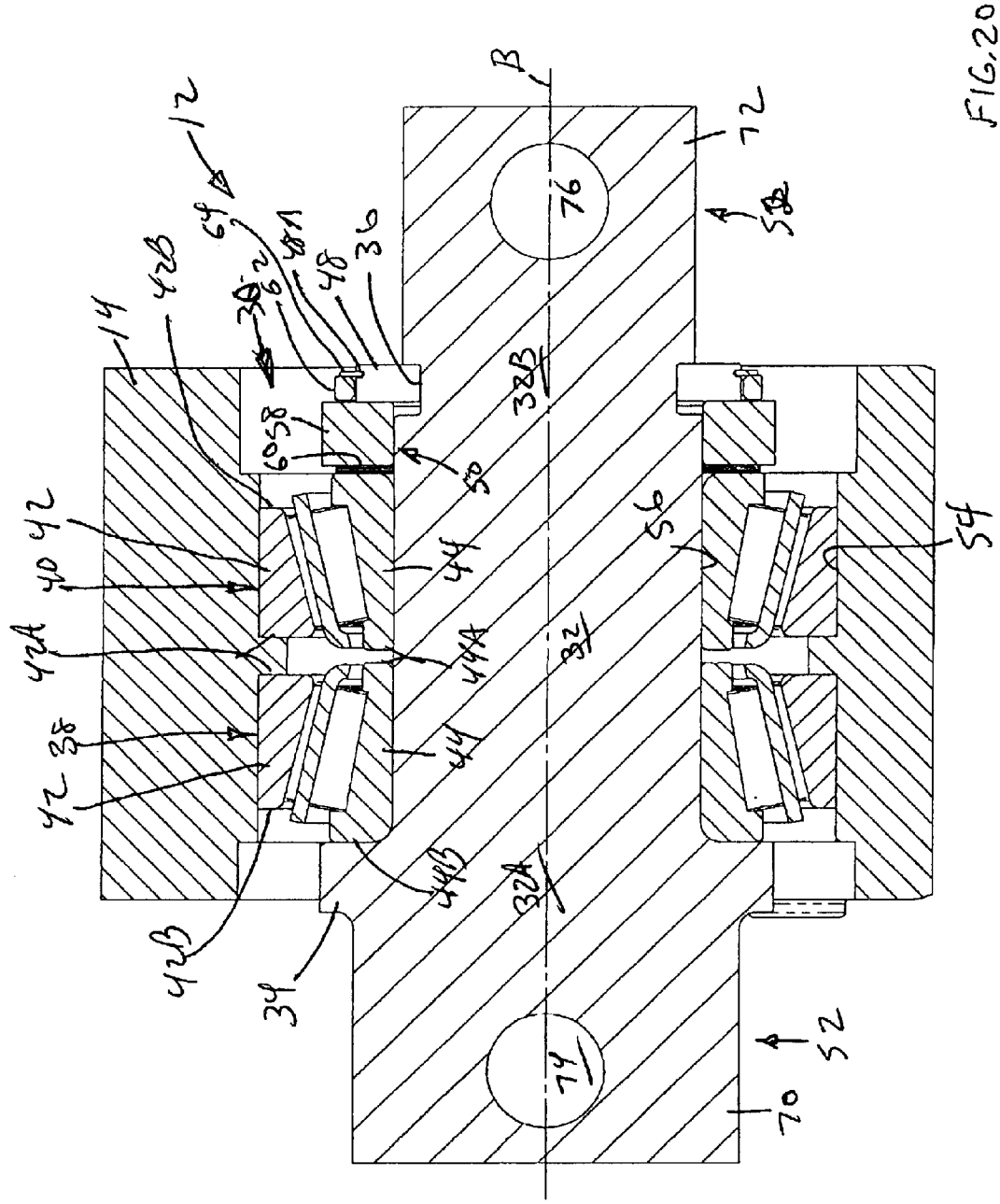

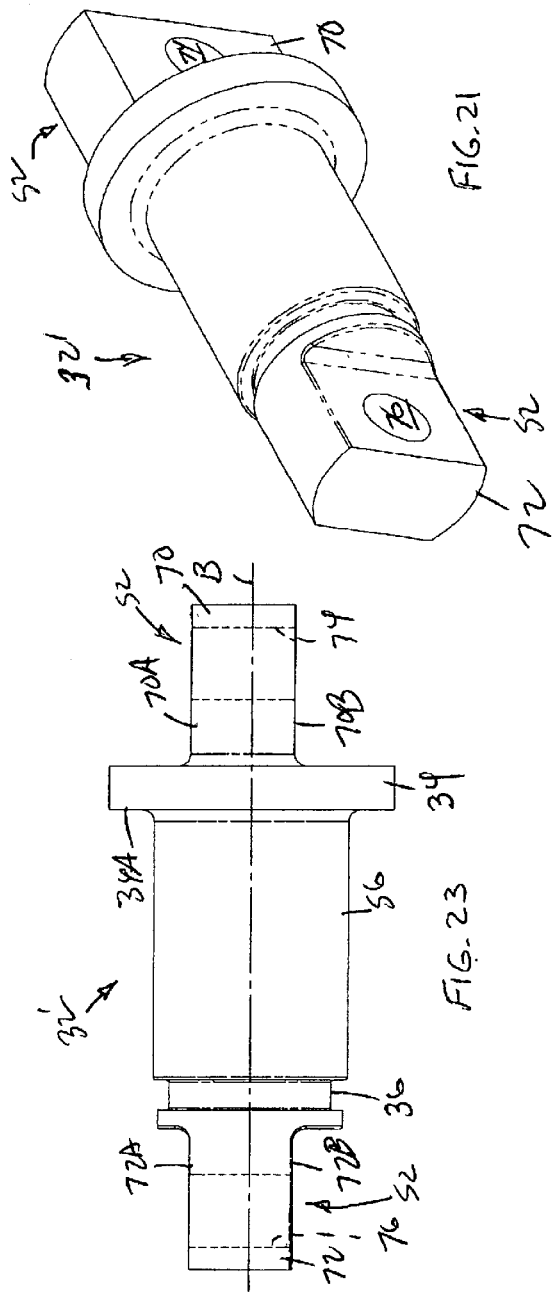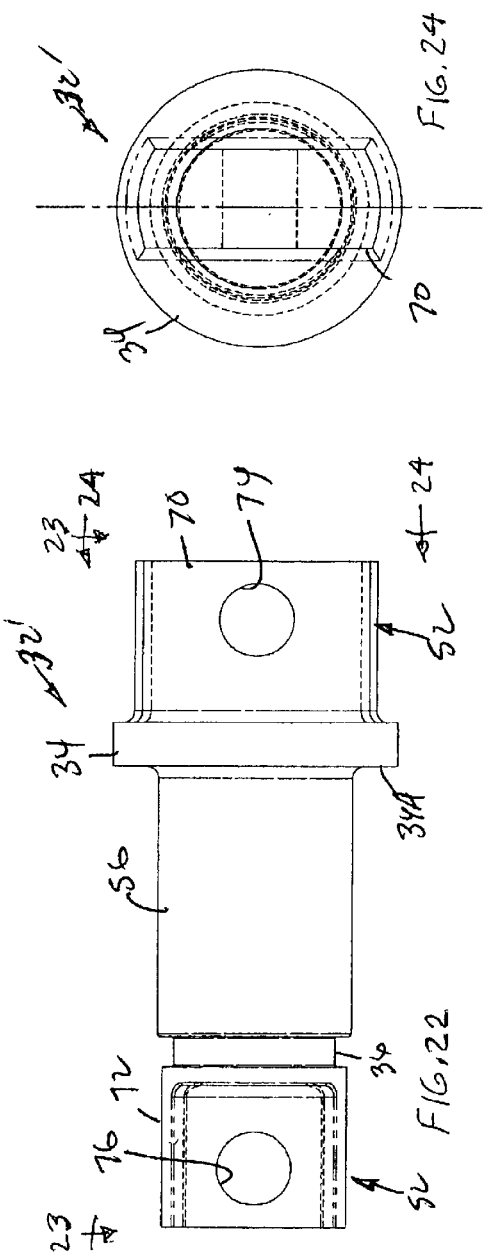

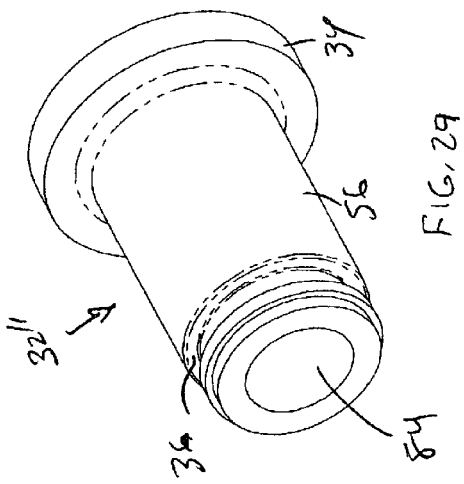
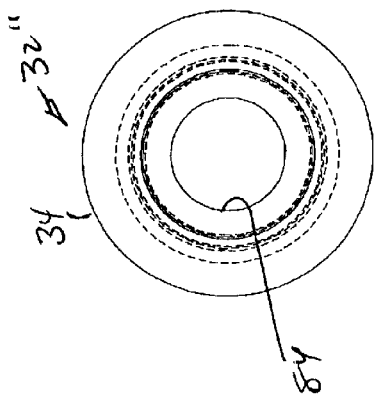
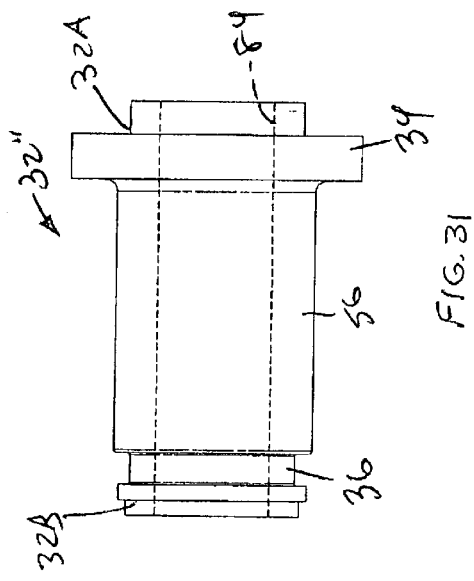
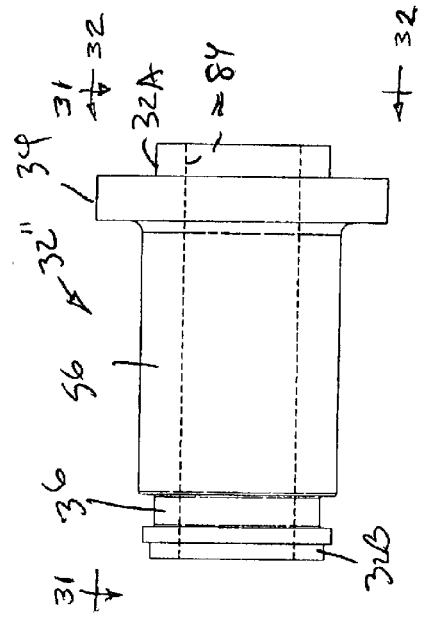

STEERING KNUCKLE CARRIER-TO-SUSPENSION ARM PIVOTAL CONNECTION AND METHOD OF ASSEMBLING AND PRELOADING THE PIVOTAL CONNECTION

BACKGROUND OF THE INVENTION

1. Field of the Invention

The present invention generally relates to components of steerable independent front suspension assemblies and, more particularly, is concerned with a steering knuckle carrier-to-suspension arm pivotal connection and a method of assembling and preloading the pivotal connection.

2. Description of the Prior Art

A conventional steerable independent front suspension (IFS) assembly for a wheeled vehicle, such as a car or truck, typically includes a steering knuckle, a carrier having a kingpin aperture, upper and lower suspension arms pivotally supporting the carrier and provided in a generally wishbone configuration therewith, and a kingpin received in the kingpin aperture and pivotally supporting the steering knuckle on the carrier. The kingpin is usually disposed in an inclined relationship to a vertical reference so as to exhibit camber such that good steering stability is provided. The steering knuckle has a spindle which extends outwardly and upon which a wheel and brake assembly is adapted to be mounted. The steering knuckle is articulated relative to the carrier by a steering linkage assembly. An example of this IFS assembly is disclosed in U.S. Pat. No. 6,116,626 to Cherry et al. Another example is known as a Dana/Kirkstall IFS84 assembly.

Each of these conventional IFS assemblies has utilized pivotal connections respectively between the upper and lower ends of the steering knuckle carrier and the corresponding upper and lower wishbone suspension arms. Each pivotal connection typically includes a pair of opposing bearing assemblies disposed within a bore defined through the respective one of the upper and lower ends of the steering knuckle carrier and an attachment member disposed through the bearing assemblies with opposite ends of the attachment member secured to the outer ends of the corresponding one of the upper and lower wishbone suspension arms such that the steering knuckle carrier can pivot relative to the wishbone suspension arms. In the case of the Cherry et al. assembly, the attachment member is a pin (or bolt) having a nut threadably secured on one end thereof. In the case of the Dana/Kirkstall IFS84 assembly, the attachment member is a pivot arm spindle (or bolt) having a stake nut threadably secured on one end thereof. In both cases, by threadably tightening the respective nuts relative to the bolts or attachment members to a specified torque, the desired preload is applied to the bearings of the pivotal connection. Also, in the case of the Dana/Kirkstall IFS 84 assembly, an annular groove is formed in each end of the steering knuckle carrier surrounding the bore at a central location and a circlip is placed in the annular groove such that the circlip is disposed between the opposing bearings. When the nut is threadably tightened relative to the bolt or attachment member the bearings become pressed against and clamped to the opposite sides of the circlip in the process of applying the desired preload force to the bearing assemblies of the pivotal connection.

Problems exist with pivotal connections which employ bolts and threadably nuts to retain the bearing assemblies under a desired level of preload force clamped to the opposite sides of circlip in the bore of the carrier. The use of the machined central groove and installation of the circlip in the carrier groove increases installation complexity and the cost of the pivotal connection. Preload clamping the bearing assemblies between mounts on the ends of the suspension arms and the central circlip by tightening a bolt and nut to a specific torque and then staking the nut to prevent loosening is inherently imprecise due to the employment of a widely variable torque tension type of preloading and thus is inconsistent from one pivotal connection to the next.

Consequently, a need still exists for an innovation in the makeup and assembling of these pivotal connections which will provide a solution to the aforementioned problem in the prior art without introducing any new problems in place thereof.

SUMMARY OF THE INVENTION

The present invention provides a steering knuckle carrier-to-suspension arm pivotal connection and a method of assembling and preloading the pivotal connection which are designed to satisfy the aforementioned need. The pivotal connection and its method of assembling and preloading of the present invention employs features which reduces installation complexity and the cost of the pivotal connection, permits the use of interchangeable components from one pivotal connection to the next, and greatly enhances the precision and consistency of the pivotal connections by employment of a forced placement type of preloading of the bearing assemblies.

Accordingly, the present invention is directed to a steering knuckle carrier-to-suspension arm pivotal connection. The pivotal connection comprises: (a) an annular member centrally located along and projecting radially into a bore through a steering knuckle carrier; (b) a pin extending through the bore and having an annular flange formed around and projecting radially outwardly from and proximate one end of the pin and an annular groove formed around and projecting radially inwardly into and proximate an opposite end of the pin; (c) a pair of opposing annular bearing assemblies disposed around the pin and located between the one and opposite ends thereof and having components rotatable relative to one another fitted around the pin and within the bore of the carrier on opposite sides of the annular member in the bore such that the pin is rotatable relative to the carrier, both of the annular bearing assemblies abutting opposite sides of the annular member in the bore, one of the annular bearing assemblies abutting a side of the annular flange on the pin and the other of the annular bearing assemblies being spaced from the annular groove in the pin so as to define an annular gap extending from the annular groove to the other annular bearing assembly; (d) a retainer member disposed in the annular groove in the pin and projecting radially outwardly beyond the pin and spaced by the annular gap from the other annular bearing assembly; (e) means positioned around the pin between the retainer member and the other annular bearing assembly so as to fill the annular gap in a manner that imposes a predetermined preload force on the annular bearing assemblies that causes the annular bearing assemblies to clamp therebetween the annular member in the bore of the carrier; and (f) means disposed at opposite ends of the pin for attaching the pin to a suspension arm.

The present invention also is directed to a method of assembling and preloading the pivotal connection comprising the steps of: (a) providing an annular member centrally located along and projecting radially into a bore through a steering knuckle carrier; (b) providing an elongated pin having an annular flange formed around and projecting radially outwardly from and proximate to one end of the pin and an annular groove formed around and projecting radially inwardly into and proximate to an opposite end of the pin; (c) placing the pin and a pair of annular bearing assemblies within the bore such that the bearing assemblies are dispose around the pin between the flange and groove thereof in abutting relationship with opposite sides of the annular member in the bore with one of the bearing assemblies also abutting the flange of the pin and the other of the bearing assemblies being spaced from the groove of the pin so as to define a gap therebetween and with the bearing assemblies having respective components rotatable relative to one another and respectively being fitted around and in contact with the pin and within and in contact with the bore of the carrier such that the pin is enabled to rotate relative to the carrier; (d) installing a spacer ring about the pin adjacent to the other bearing assembly and the groove in the pin; (e) applying a predetermined preload force against the spacer ring in the direction of the bearing assemblies so as slide the spacer ring toward the other bearing assembly and away from the groove; (f) installing a retainer ring in the annular groove; (g) measuring the width along the pin of a space left between the spacer ring and retainer ring and predetermining the number of annular shims it takes to fill the space; (h) removing the predetermined preload force and the retainer ring; (i) installing the predetermined number of annular shims along with the spacer ring around the pin in the gap between the annular groove in the pin and the other bearing assembly; (j) reapplying the predetermined preload force against the spacer ring and annular shims in the direction of the bearing assemblies so as slide the spacer ring and annular shims toward the other bearing assembly and away from the groove; and (k) reinstalling the retainer ring in the groove so as to retain the spacer ring and annular shims around the pin so as to fill the gap in a manner that imposes the predetermined preload force on the bearing assemblies that causes the bearing assemblies to clamp therebetween the annular member in the bore of the carrier.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is an exploded view of a steering knuckle carrier, wishbone suspension arms and the components forming preloaded bearing assemblies of the pivotal connections between the carrier and wishbone suspension arms in FIG. 1.

FIG. 3 is an exploded view of the same components as seen in FIG. 2 except for omission of the suspension arms.

FIG. 4 is an enlarged perspective view of a first embodiment of a pin employed in the preloaded bearing assembly of each of the pivotal connections.

FIG. 5 is a side elevational view of the pin of FIG. 4.

FIG. 6 is another side elevational view of the pin as seen along line 6—6 of FIG. 5.

FIG. 7 is an end elevational view of the pin as seen along line 7—7 of FIG. 5.

FIGS. 9–20 are a series of axial sectional views of the one pivotal connection of FIG. 8 showing the sequence of steps of a method of assembling and preloading the pivotal connection with the final step being shown in FIG. 8 and with FIG. 17A being an enlarged view of the details of the pivotal connection encompassed by the circle 17A in FIG. 17.

FIG. 21 is an enlarged perspective view of a modified emobidment of a pin employed in the preloaded bearing assembly of each of the pivotal connections.

FIG. 22 is a side elevational view of the pin of FIG. 21.

FIG. 23 is another side elevational view of the pin as seen along line 23—23 of FIG. 22.

FIG. 24 is an end elevational view of the pin as seen along line 24—24 of FIG. 22.

FIG. 29 is an enlarged perspective view of a second embodiment of a pin employed in the preloaded bearing assembly of each of the pivotal connections.

FIG. 30 is a side elevational view of the pin of FIG. 29.

FIG. 31 is another side elevational view of the pin as seen along line 31—31 of FIG. 30.

FIG. 32 is an end elevational view of the pin as seen along line 32—32 of FIG. 30.

DETAILED DESCRIPTION OF THE INVENTION

Figure 1:
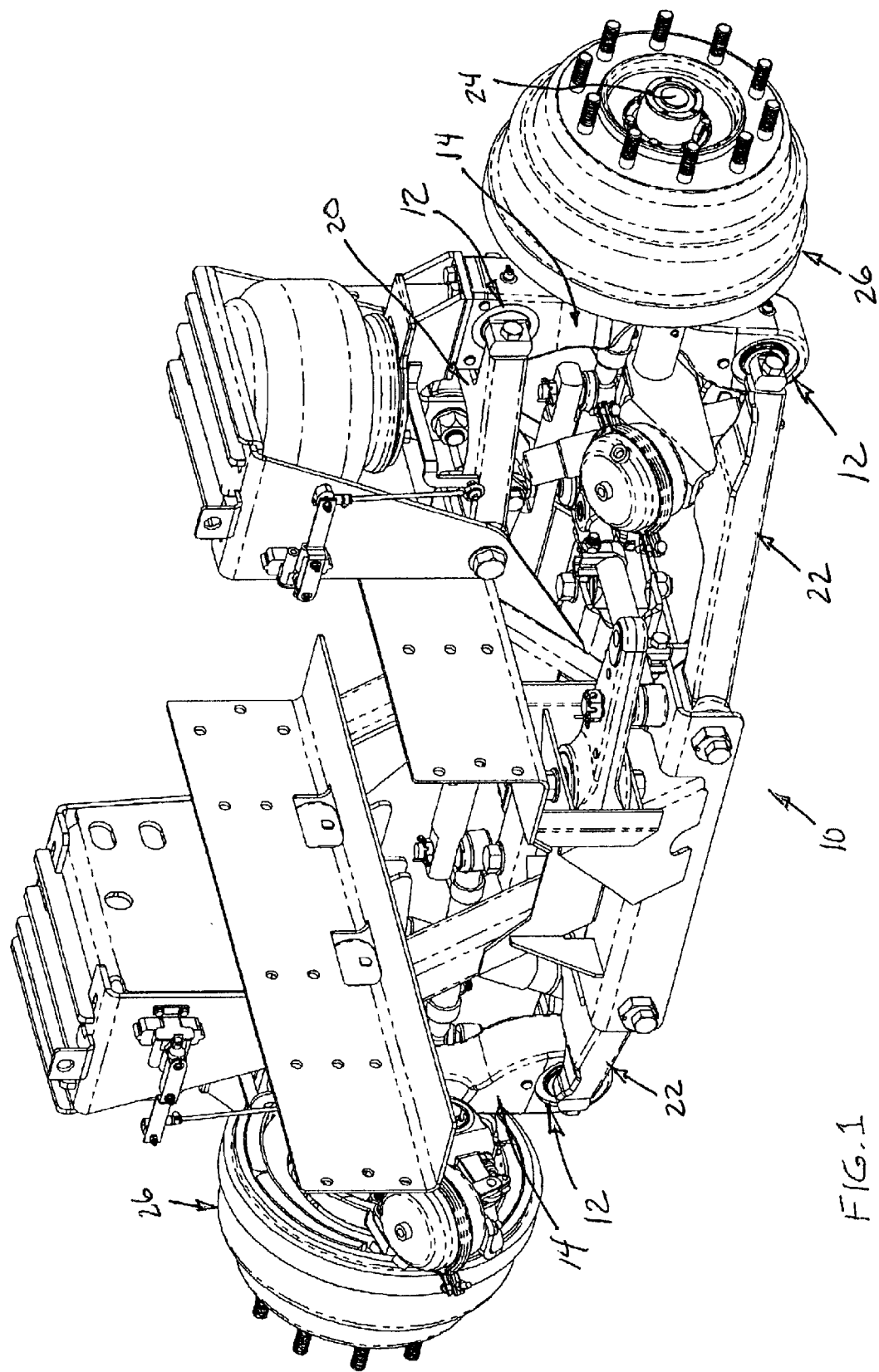
FIG. 1 is a perspective view of a steerable-independent front suspension (IFS) system employing a first embodiment of a plurality of steering knuckle carrier-to-suspension arm pivotal connections of the present invention.

Referring to the drawings and particularly to FIG. 1, there is illustrated a steerable independent front suspension (IFS) system, being generally designated 10, which employs a first embodiment of a plurality of steering knuckle carrier-to-suspension arm pivotal connections of the present invention, being generally designated 12 and shown in detail in FIGS. 2 and 3. The steerable IFS system 10, particularly adapted for use in conjunction with a wheeled vehicle such as a car, truck and the like, generally includes a steering knuckle (not seen), a carrier 14 having a kingpin boss 16 defining an aperture 18, upper and lower suspension arms 20, 22 pivotally supporting the steering knuckle carrier 14 via the pivotal connections 12 of the present invention and provided in a generally wishbone configuration therewith, and a kingpin (not seen) received in the kingpin aperture 18 and pivotally supporting the steering knuckle on the carrier 14. The kingpin is usually disposed along an axis A in an inclined relationship to a vertical reference so as to exhibit camber such that good steering stability is provided. The steering knuckle has a spindle 24 which extends outwardly and upon which a wheel and brake assembly 26 is adapted to be mounted. The steering knuckle is articulated relative to the carrier 14 by a steering linkage assembly (not seen).

Referring now to FIGS. 1–9, there is shown a first embodiment of the pivotal connections 12. Each pivotal connection 12 basically includes an annular member 28 centrally located along and projecting radially into a bore 30 through the steering knuckle carrier 14, an elongated pin 32 extending through the bore 30 and having an annular flange 34 formed around and projecting radially outwardly from and proximate to one end 32A of the pin 32 and an annular groove 36 formed around and projecting radially inwardly or recessed into the pin 32 proximate to an opposite end 32B of the pin 32, and a pair of opposing annular bearing assemblies 38, 40 disposed around the pin 32 and located between the one and opposite ends 32A, 32B thereof and having components, namely outer cups 42 and inner races 44, rotatable relative to one another fitted around the pin 32 and within the bore 30 of the carrier 14 on opposite sides of the annular member 28 in the bore 30 such that the pin 32 is rotatable relative to the carrier 14. The annular bearing assemblies 38, 40 abut opposite sides 28A, 28B of the annular member 28 in the bore 30. One annular bearing assembly 38 also abuts a side 34A of the annular flange 34 on the pin 32. The other annular bearing assembly 40 is spaced from the annular groove 36 in the pin 32 so as to define an annular gap 46 extending from the annular groove 36 to the other annular bearing assembly 40. The pivotal connection 12 also includes a retainer member 48 disposed in the annular groove 36 in the pin 32 and projecting radially outwardly beyond the pin 32 and spaced by the annular gap 46 from the other annular bearing assembly 40. Means 50 is positioned around the pin 32 between the retainer member 48 and the other annular bearing assembly 40 so as to fill the annular gap 46 in a manner that imposes a predetermined preload on the annular bearing assemblies 38, 40 that causes the annular bearing assemblies 38, 40 to clamp therebetween the annular member 28 in the bore 30 of the carrier 14. Means 52 is disposed at the opposite ends 32A, 32B of the pin 32 for attaching the pin 32 to the ends of the respective one of the suspension arms 20, 22.

More particularly, an annular member 28 preferably is a ring shaped segment which is integrally provided generally centrally on a cylindrical interior surface 54 of a first diameter D1 defining the bore 30 through the carrier 14. The annular member 28 projects radially from the cylindrical interior surface 54 into the bore 30 so as to define a pair of annular surfaces on opposite sides 28A, 28B of the annular member 28 facing in opposite directions from one another. The elongated pin 32 extending through the bore 30 has a cylindrical exterior surface 56 thereabout of a second diameter D2 less than the first diameter D1 extending between the annular flange 34 and the annular groove 36 and spaced radially inwardly from the cylindrical interior surface 54 of the carrier 14. The annular flange 34 of the pin 32 has a third diameter D3 less than the first diameter D1 and greater than the second diameter D2. The annular groove 36 in the pin 32 has a fourth diameter D4 less than the second diameter D2.

The inner races 44 of the annular bearing assemblies 38, 40 are fitted around and in contact with the cylindrical exterior surface 56 of the pin 32 and the outer cups 42 of the annular bearing assemblies 38, 40 are fitted within and in contact with the cylindrical interior surface 54 of the carrier 14 such that the pin 32 is enabled to rotate with the inner races 44 relative to the outer cups 42 with the carrier 14. Furthermore, the outer cups 42 have first ends 42A disposed adjacent to one another abutting the opposite sides 28A, 28B of the annular member 28 in the bore 30 on the carrier 14 and second ends 42B remote from one another. The inner races 44 have first ends 44A spaced from one another and second ends 44B remote from one another facing in opposite directions such that the second end 44B of the inner race 44 of the one annular bearing assembly 38 abuts the side 34A of the annular flange 34 on the pin 32 and the second end 44B of the inner race 44 of the other annular bearing assembly 40 is spaced from the annular groove 36 in the pin 32 by the distance defined by annular gap 46 extending from the annular groove 36 to the second end 44B of the inner race 44 of the other annular bearing assembly 40.

The retainer member 48 preferably takes the form of a two-piece split ring member disposed in the annular groove 36 at an opposite end of the cylindrical exterior surface 56 of the pin 32. The retainer member 48 projects radially outwardly beyond the cylindrical exterior surface 56 of the pin 32 and thus is spaced by the annular gap 46 from the second end 44B of the inner race 44 of the other annular bearing assembly 40. Means 50 filling the annular gap 46 is preferably a stack of annular spacer elements, taking the form of a spacer ring 58 and one or more annular shims 60, positioned around the cylindrical exterior surface 56 of the pin 32 between the retainer member 48 and the second end 44B of the inner race 44 of the other annular bearing assembly 40 so as to fill the annular gap 46 in a manner that imposes a predetermined preload force on the second ends 44B of the inner races 44 of the annular bearing assemblies 38, 40 that causes the first ends 42A of the outer cups 42 of the annular bearing assemblies 38, 40 to clamp therebetween the centrally located annular member 28 in the bore 30 on the carrier 14.

The pivotal connection 12 further includes a collar 62, a snap ring 64, and a pair of annular seals 66, 68. The collar 62 is disposed around the retainer member 48 so as to prevent the retainer member 48 from inadvertently coming out of the annular groove 36 of the pin 32. The snap ring 64 is disposed in an outer groove 48A in the retainer member 48 outside of the collar 62 so as to prevent the collar 62 from being inadvertently removed from around the retainer member 48. One seal 66 is disposed in the bore 30 around the flange 34 at one end 32A of the pin 32. The other seal 68 is disposed in the bore 30 around the spacer ring 58 adjacent to the other end 32B of the pin 32.

Referring to FIGS. 4–7 and 21–24, there is shown the first embodiment of the means 52 which is disposed at opposite ends of the pin 32 for attaching the pin 32 to ends of one of the suspension arms 20, 22. The means 52 includes a pair of tabs 70, 72 each integrally attached to one of the opposite ends 32A, 32B of the pin 32 and axially protruding therefrom. The tabs 70, 72 have holes 74, 76 defined therethrough for receiving fasteners 78, as seen in FIG. 1, through the holes 74, 76 to fasten the tabs 70, 72 to the ends of the respective suspension arms 20, 22. In FIGS. 4–7, the pin 32 has a longitudinal central axis B and the tabs 70, 72 have a pair of opposite surfaces 70A, 70B and 72A, 72B facing in opposite directions and displaced at the same distance away from the longitudinal central axis B of the pin 32. In FIGS. 21–24 there is shown a pin 32' which contains a modification of the pin 32 and can be employed in the pivotal connection 12 in place of the pin 32. The modified pin 32' also has a longitudinal central axis B but the opposite surfaces 70A, 70B and 72A, 72B of its tabs 70, 72 are displaced different distances away from the longitudinal central axis B of the pin 32'. By rotating the pin 32' about the longitudinal central axis B thereof relative to the carrier 14 and to one or the other of first and second angular positions displaced from one another through one hundred eighty degrees the camber of the carrier 14 can be adjusted or varied relative to the vertical reference.

Figure 8:
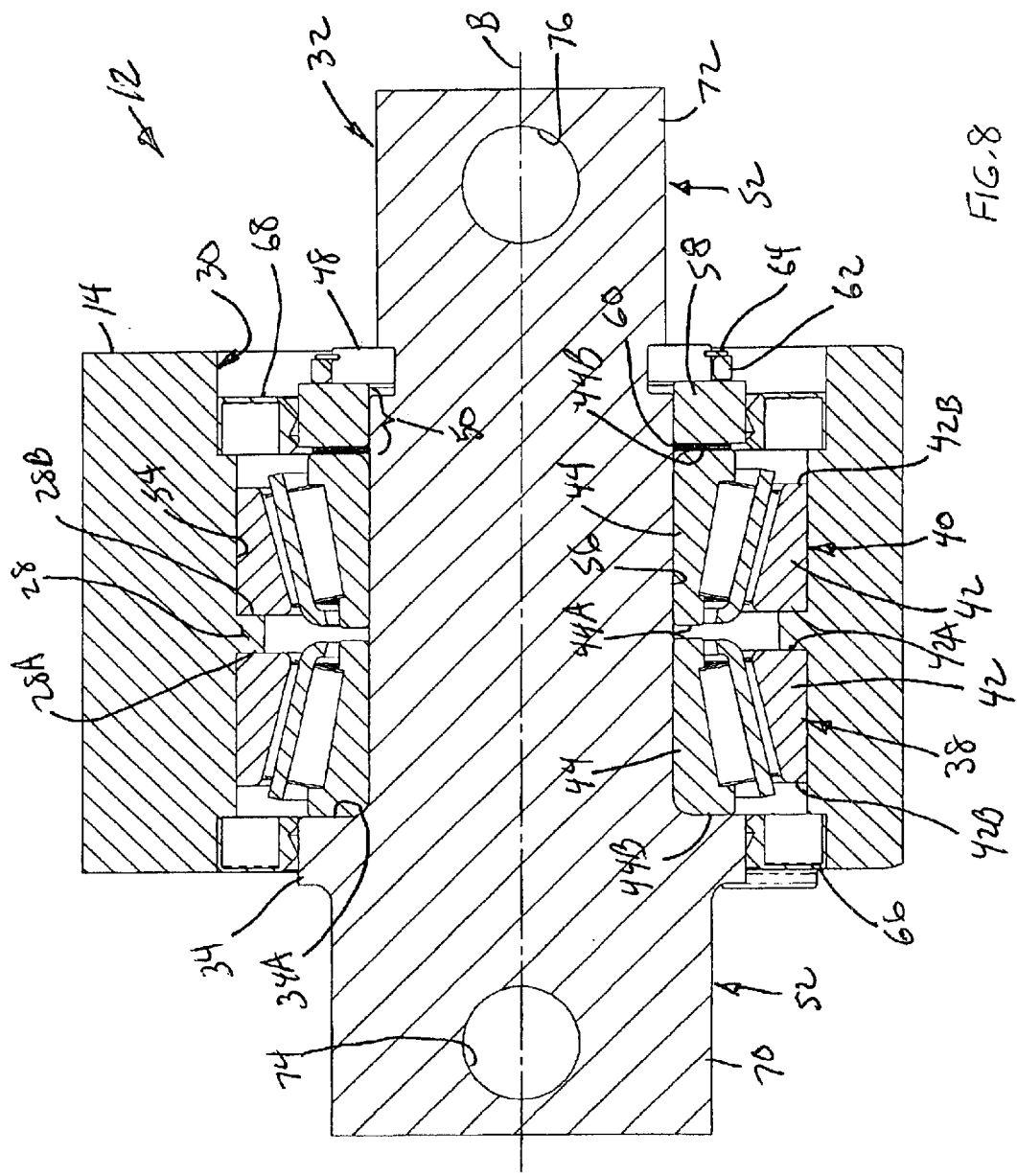
FIG. 8 is an enlarged assembled axial sectional view of one of the pivotal connections shown in FIG. 3.
Figure 9:
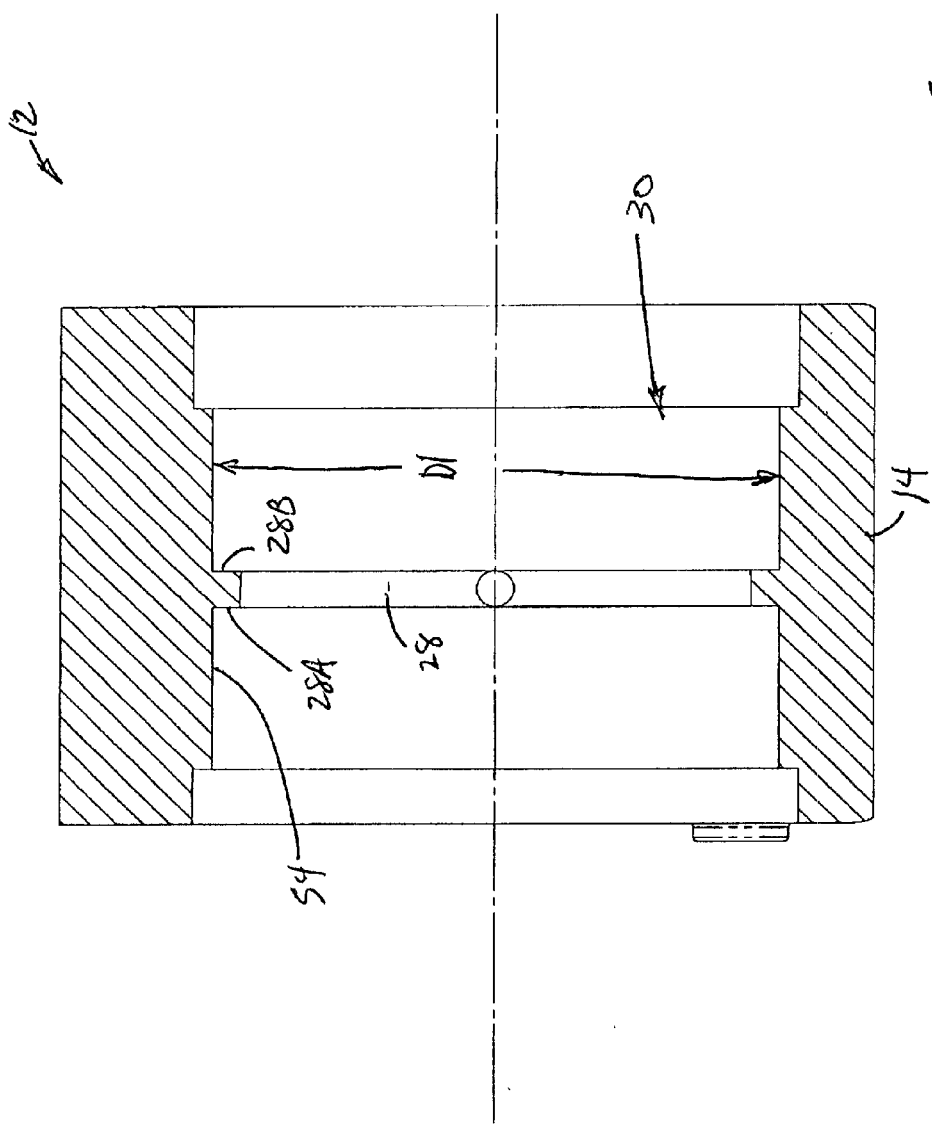

Referring now to FIGS. 9–20, there is illustrated a sequence of the steps of the method of the present invention of assembling and preloading the pivotal connection 12, with the final step being shown in FIG. 8. As seen in FIGS. 9–12, the first and second steps of the method entail providing the annular member 28, in the form of the machined ring shaped segment, and providing the elongated pin 32 as described hereinbefore, whereas the third step entails placing the pin 32 and a pair of annular bearing assemblies 38, 40 within the bore 30 such that the bearing assemblies 38, 40 are dispose around opposite end portions and along the cylindrical exterior surface 56 of the pin 32 between the flange 34 and groove 36 thereon in abutting relationship with opposite sides 28A, 28B of the annular member 28 in the bore 30 with the one bearing assembly 38 also abutting the flange 34 of the pin 32 and the other bearing assembly 40 spaced from thegroove 36 so as to define the annular gap 46 therebetween. The inner races 44 and outer cups 42 of the bearing assemblies 38, 40 are rotatable relative to one another and respectively are fitted around and in contact with the pin 32 and within and in contact with cylindrical interior surface 54 surrounding the bore 30 of the carrier 14 such that the pin 32 is enabled to rotate relative to the carrier 14.

Figure 10:
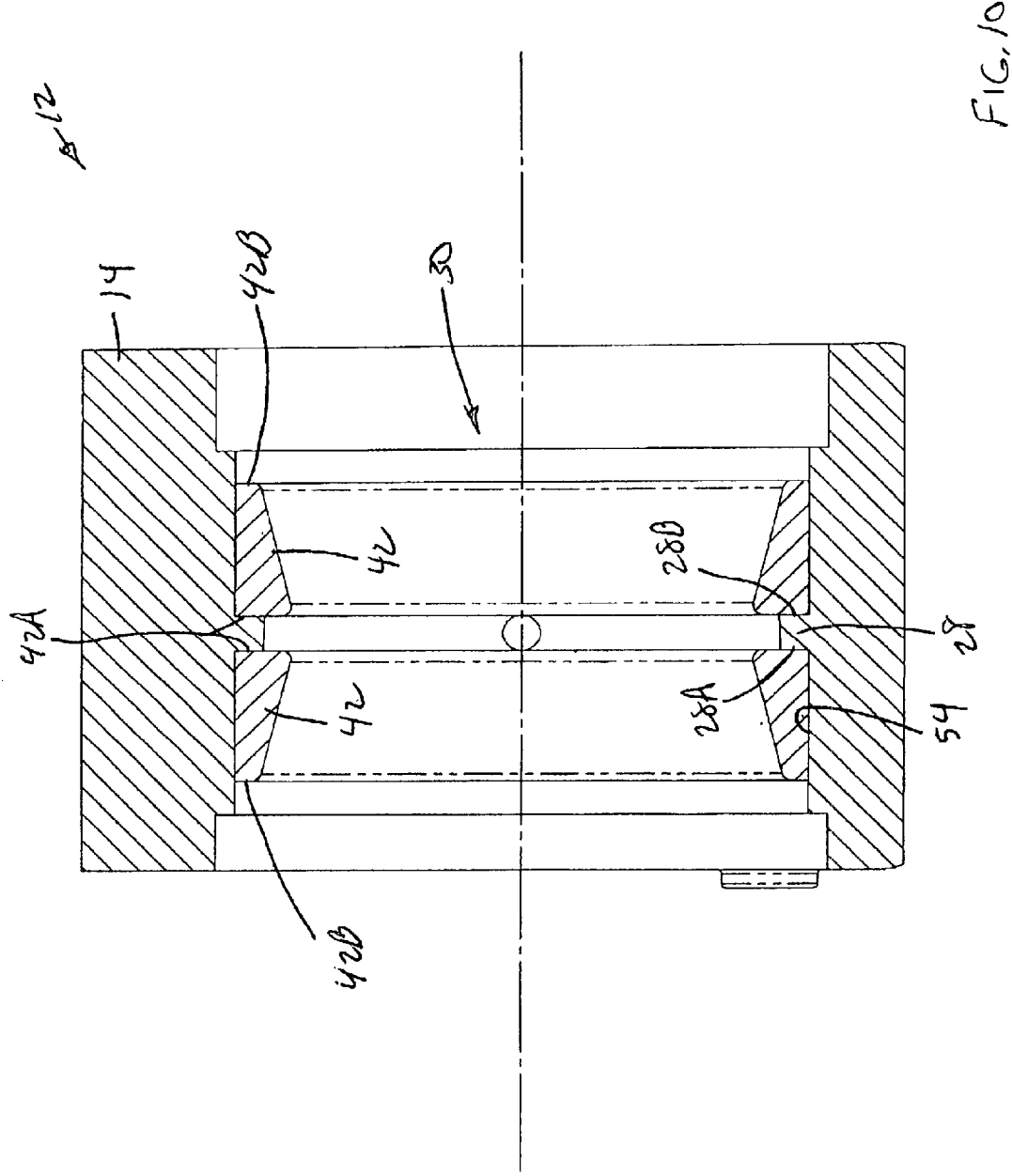
Figure 11:
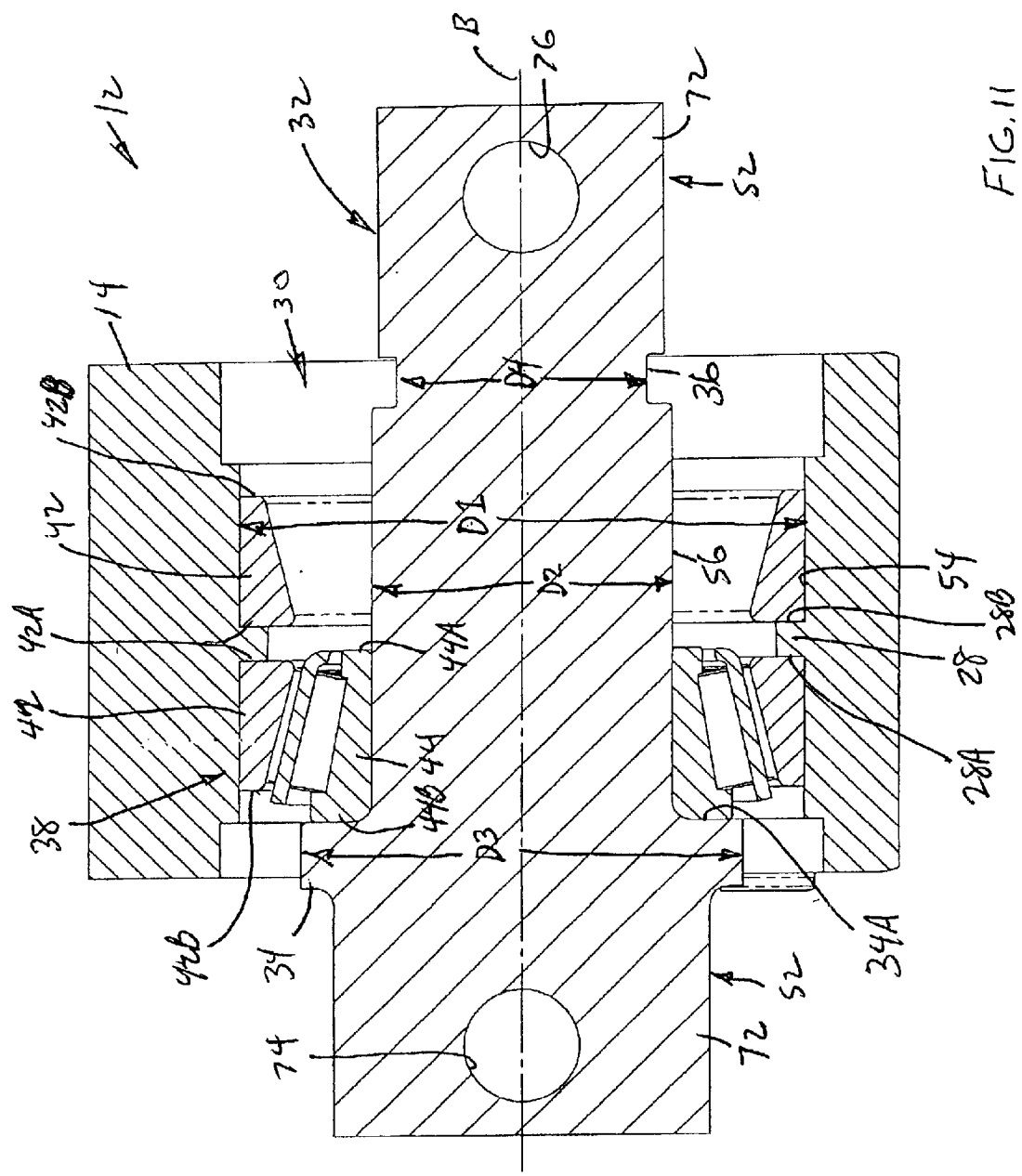
Figure 12:
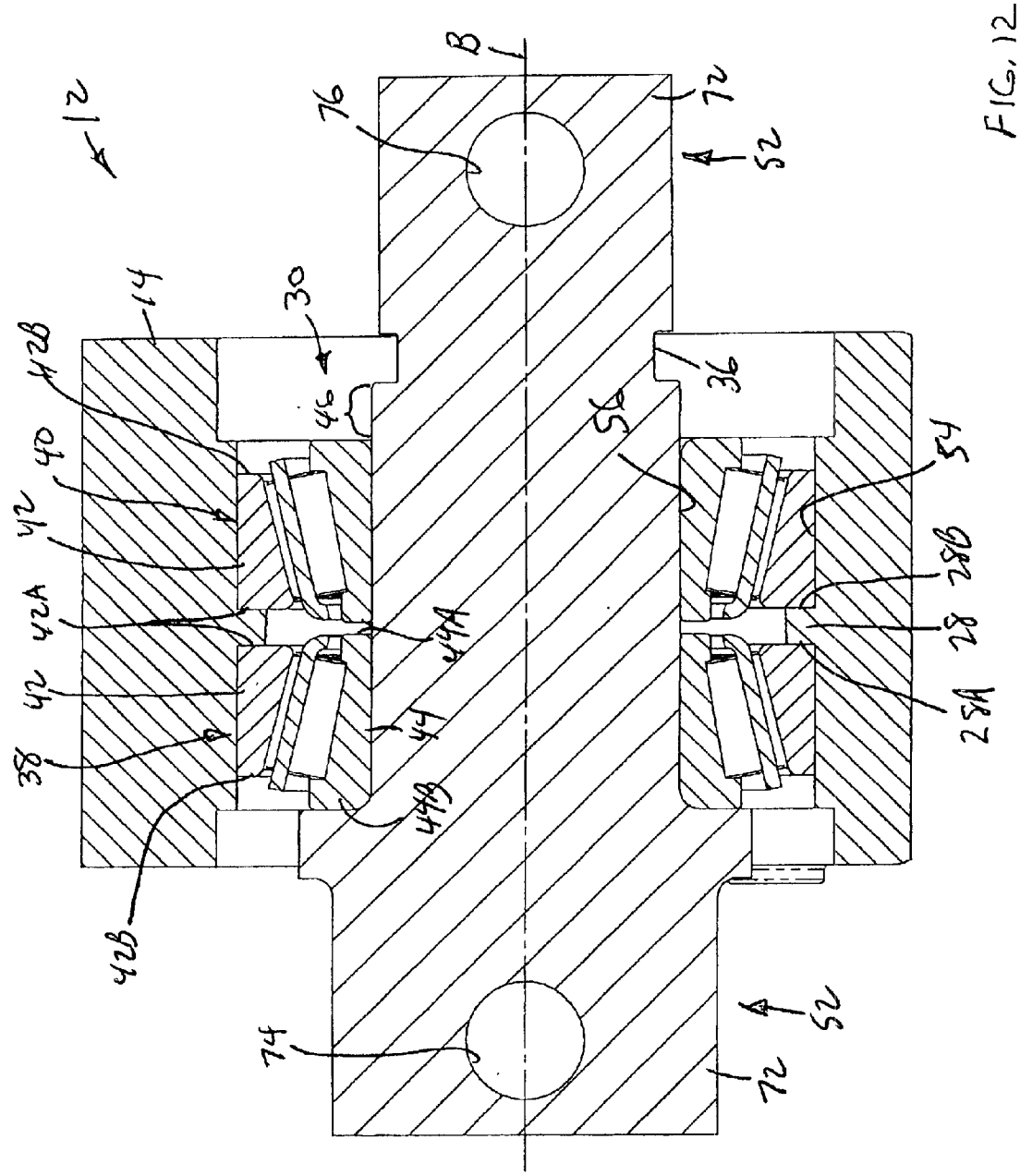

More particularly, this third step includes a sequence of preferred substeps as seen in FIGS. 10, 11 and 12: first, the outer cups 42 of the bearing assemblies 38, 40 are installed into the bore 30 in contact with the cylindrical interior surface 54 of the carrier 14 at the opposite sides 28A, 28B of the annular member 28 thereon (see FIG. 10); next, the pin 32 with the inner race 44 of the one bearing assembly 38 disposed around and in contact with the cylindrical exterior surface 56 and along one end portion of the pin 32, is installed into and through the bore 30 and into the corresponding one outer cup 42 (see FIG. 11); and, last, the inner race 42 of the other bearing assembly 40 is installed in the corresponding other outer cup 42 in the bore 30 and disposed around and in contact with the cylindrical exterior surface 56 of the pin 32 and along the opposite end portion of the pin 32 on the opposite side 28B of the annular member 28.

Figure 13:
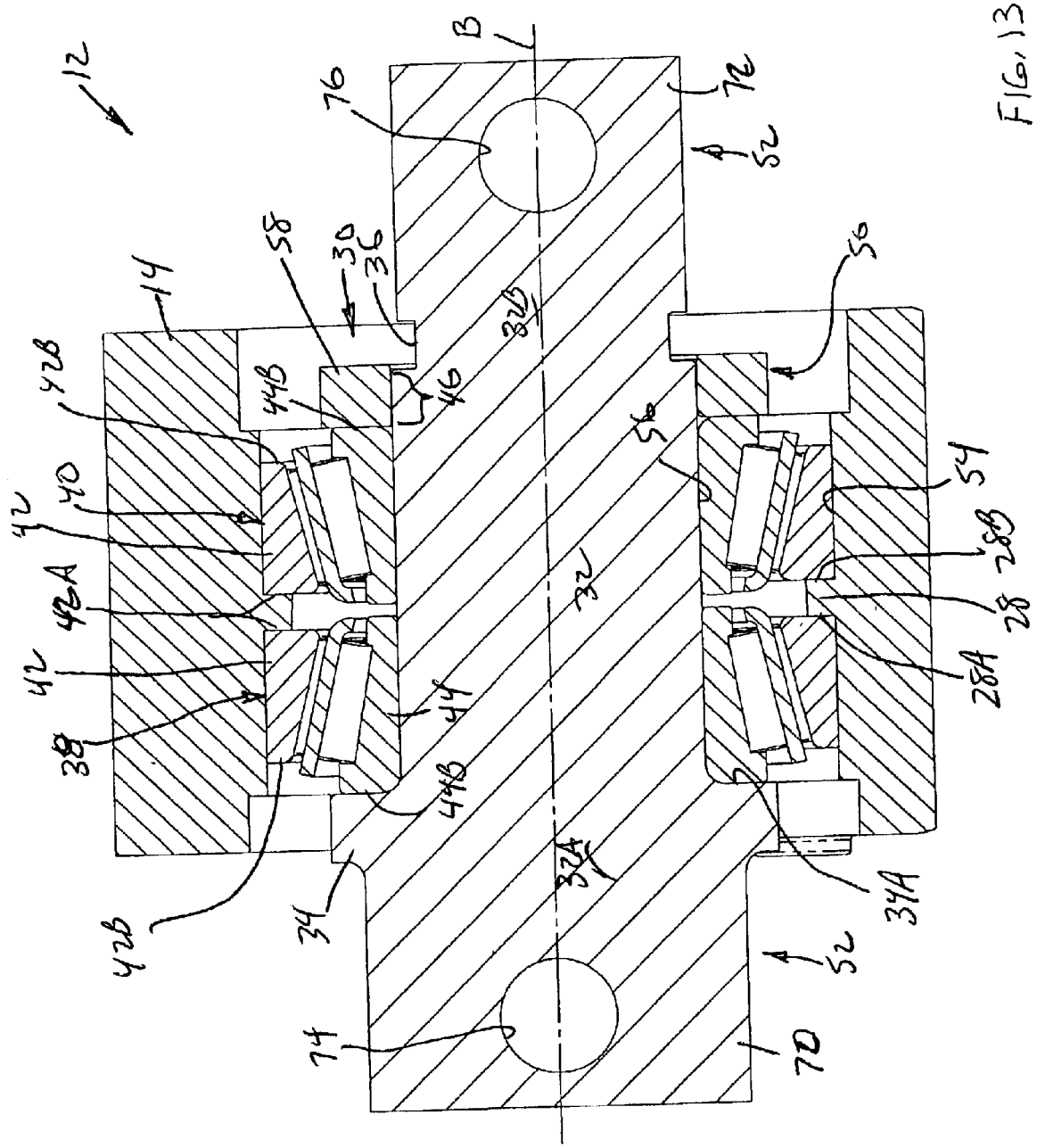

As seen in FIG. 13, the fourth step of the method entails installing the spacer ring 58 in the bore 30 about the pin 32 adjacent to the other bearing assembly 40 and the groove 36 in the pin 32. The spacer ring 58 is positioned over the cylindrical exterior surface 56 of the pin 32 and abuts the second end 44B of the inner race 44 of the other bearing assembly 40.

Figure 14:
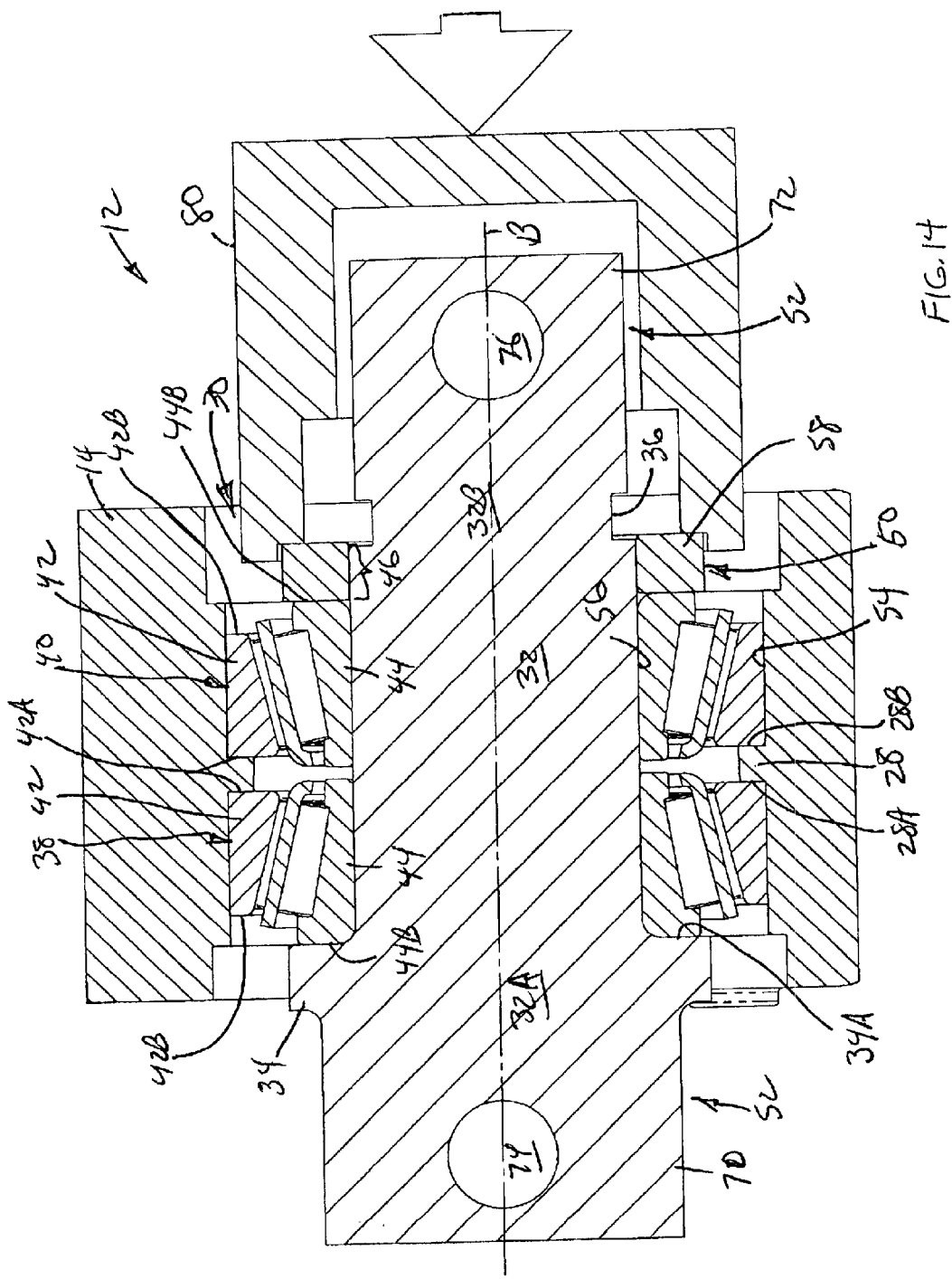

As seen in FIG. 14, the fifth step of the method entails applying a predetermined desired preload force by bringing a mandrel 80 against the outer side of the spacer ring 58 and in the direction of the bearing assemblies 38, 40 so as cause the spacer ring 58 to slide toward the other bearing assembly 40 and away from the groove 36. By way of an example only, the desired preloading force applied by the mandrel 80 can be between 500 and 600 lbs.

Figure 15:
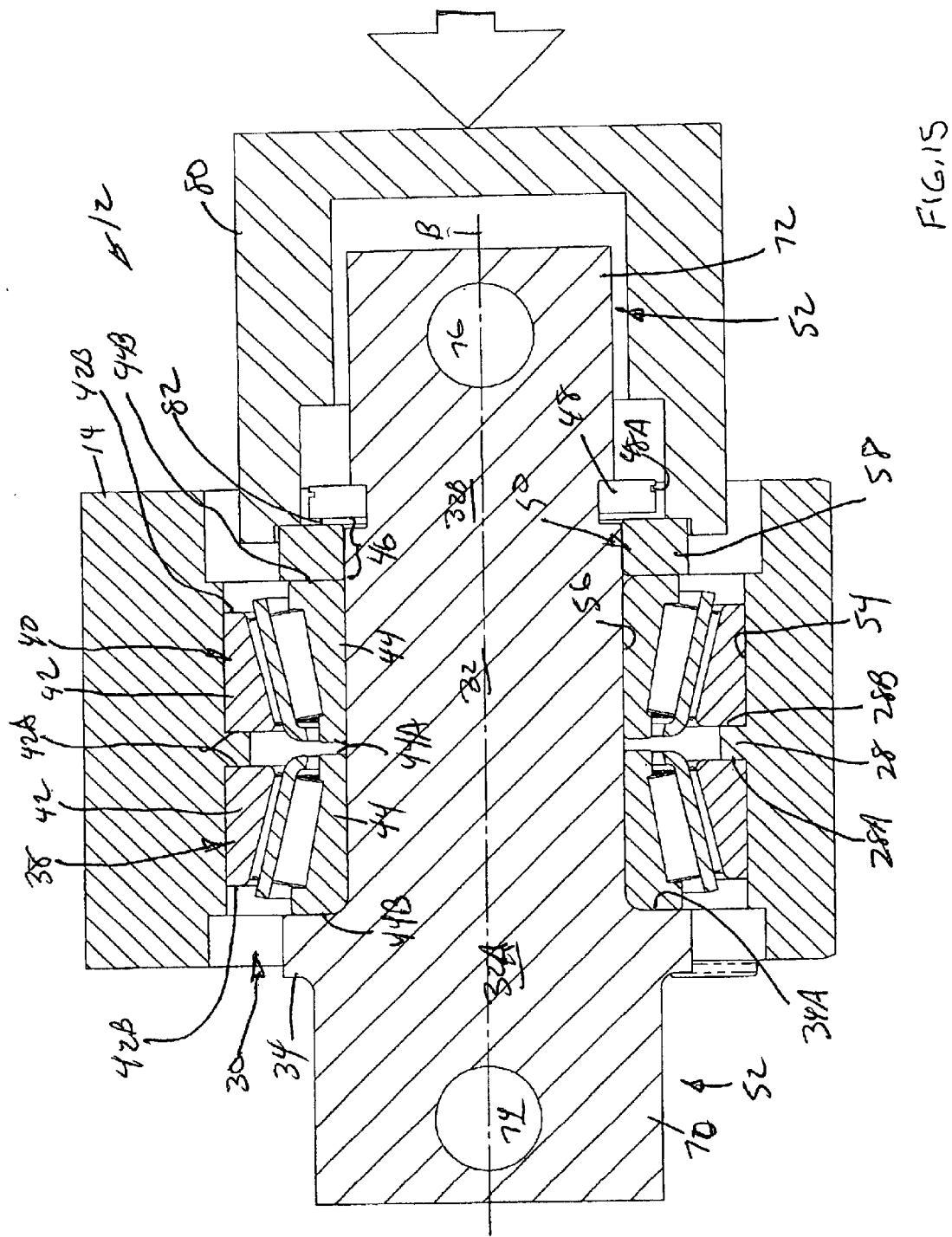

As seen in FIG. 15, the sixth step of the method entails maintaining the preload force applied by the mandrel 80 against the spacer ring 58 while installing the retainer member 48 into the annular groove 36. A window is provided in the mandrel 80 to allow the installation of the retainer member 48 while the preload force is being applied by mandrel 80 to spacer ring 58.

Figure 16:
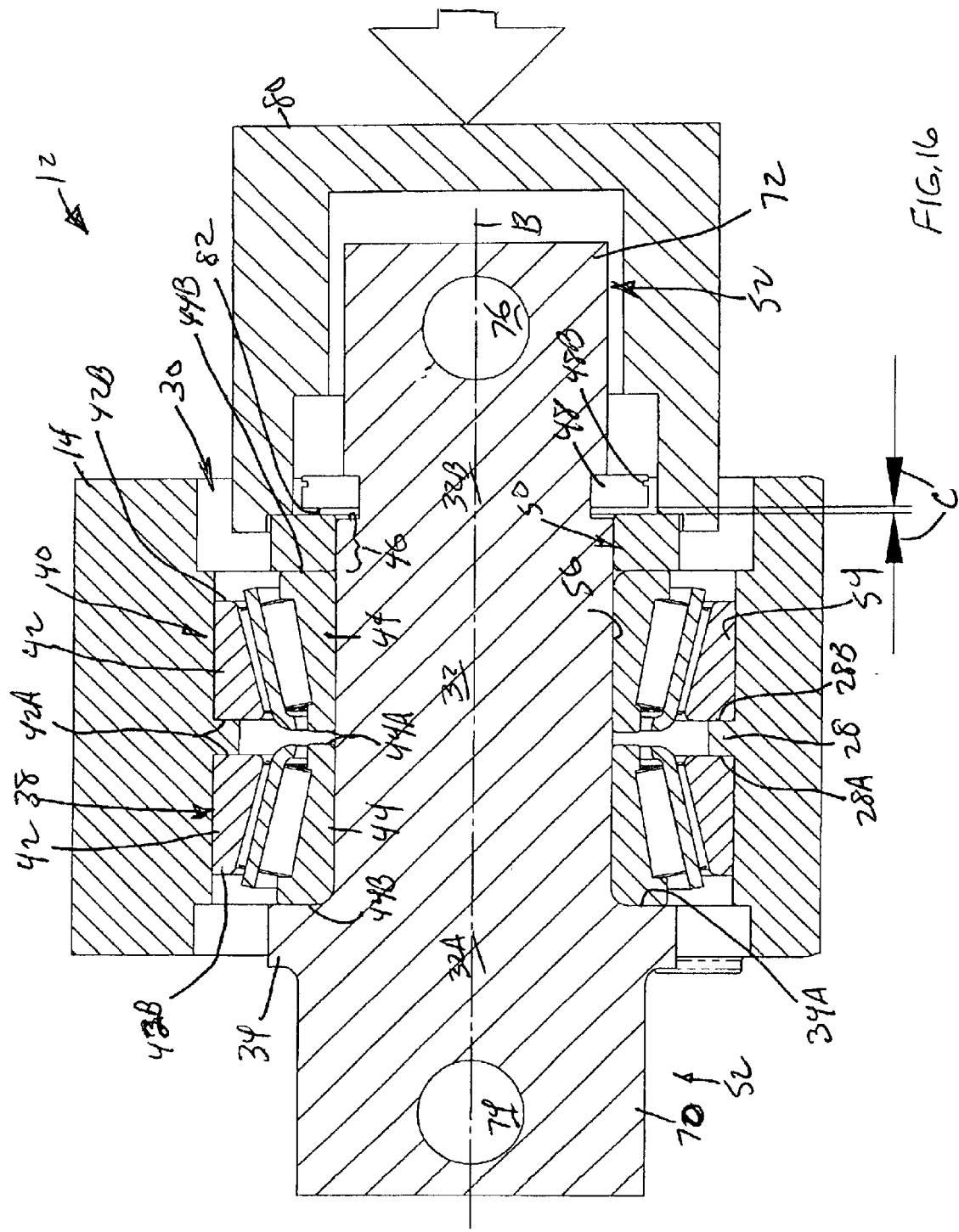

As seen in FIG. 16, the seventh step of the method entails measuring the width (distance between the two arrows C) along the pin 32 of a space 82 left between the spacer ring 58 and retainer member 48 and predetermining the number of annular shims 60 it will be needed to fill the space 82.

Figure 17:
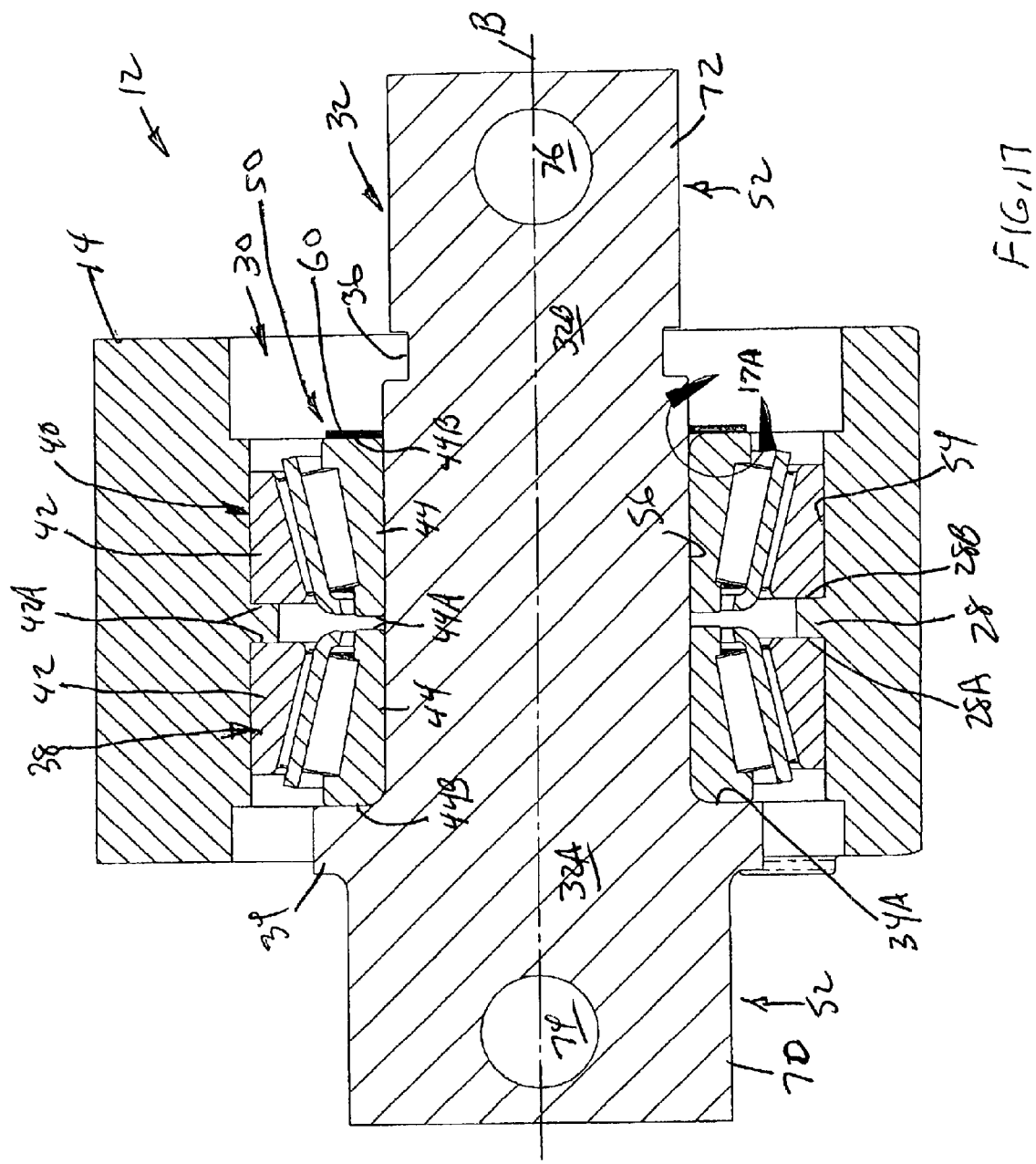
Figure 17A:
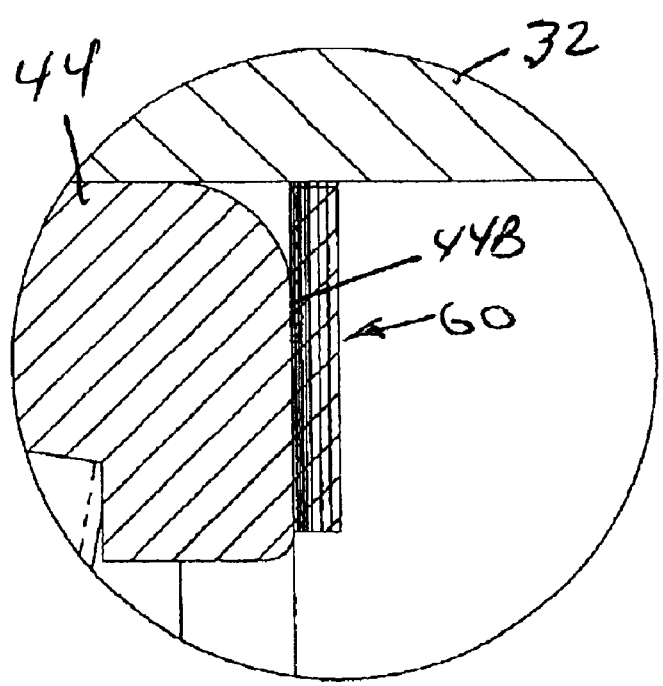

As seen in FIGS. 17 and 17A, the eighth step of the method entails removing the retainer member 48 and removing the mandrel 80 and spacer ring 58 in order to temporarily remove the predetermined preload force in order to install a predetermined number of individual shims 60 in a stacked relationship around the pin 32 and in abutting relation to the second end 44B of the inner race 44 of the other bearing assembly 40.

Figure 18:
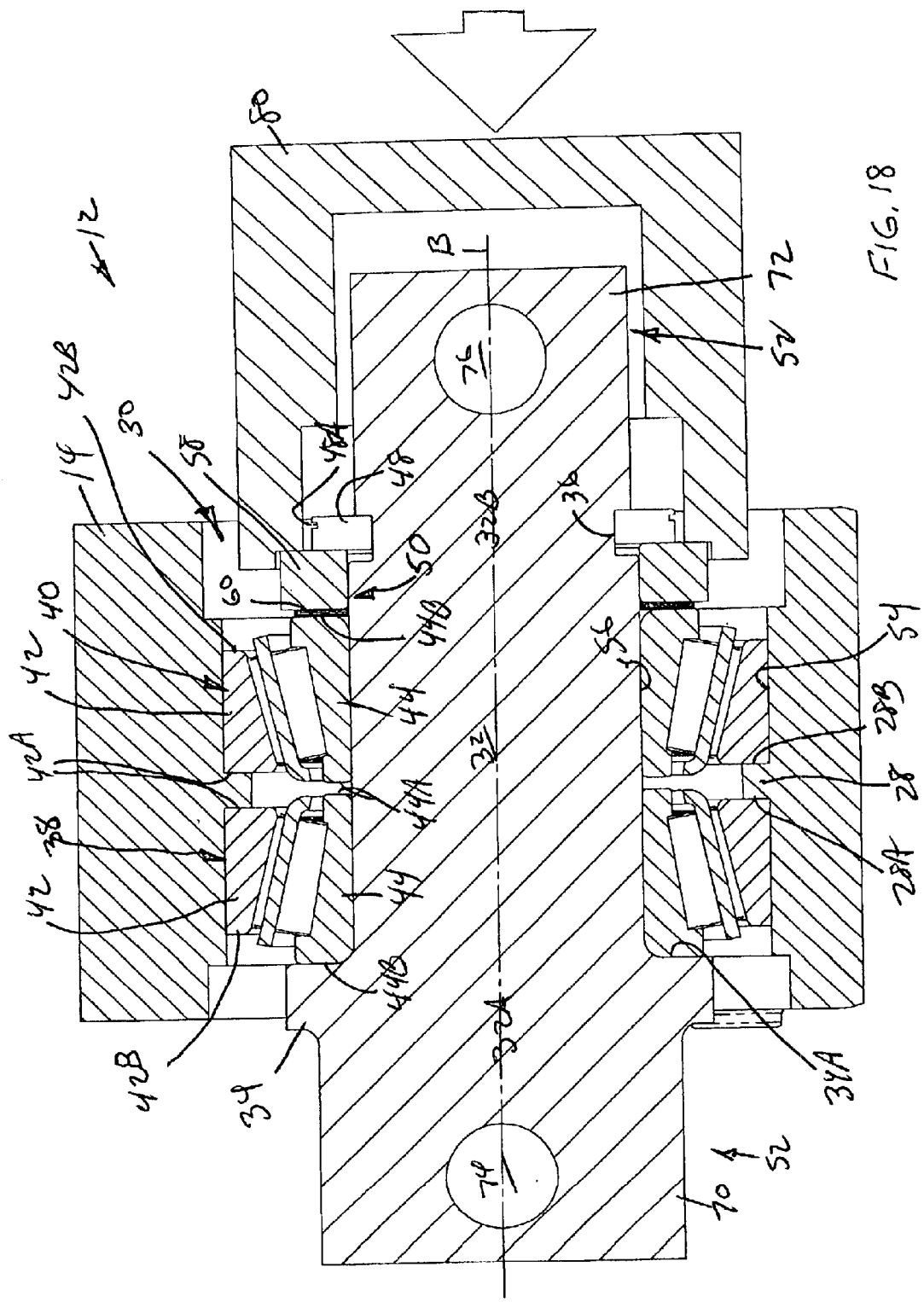

As seen in FIG. 18, the ninth step of the method entails installing the predetermined number of annular shims 60 along with the spacer ring 58 around the pin 32 in the annular gap 46 between the annular groove 36 in the pin 32 and the second end 44B of the inner race 44 of the other bearing assembly 40. Also, as seen in FIG. 18, the tenth step of the method entails reapplying the same predetermined preload force against the spacer ring 58 and annular shims 60 in the direction of the bearing assemblies 38, 40 so as slide the spacer ring 58 and annular shims 60 toward the other bearing assembly 40 and away from the groove 36 so that the retainer member 48 can be reinstalled in the groove 36 so as to retain the spacer ring 58 and annular shims 60 around the pin 32 so as to fill the gap 46 in the manner that imposes the predetermined preload on the bearing assemblies 38, 40 that causes the bearing assemblies 38, 40 to clamp therebetween the annular member 28 in the bore 30 of the carrier 14.

Figure 19:
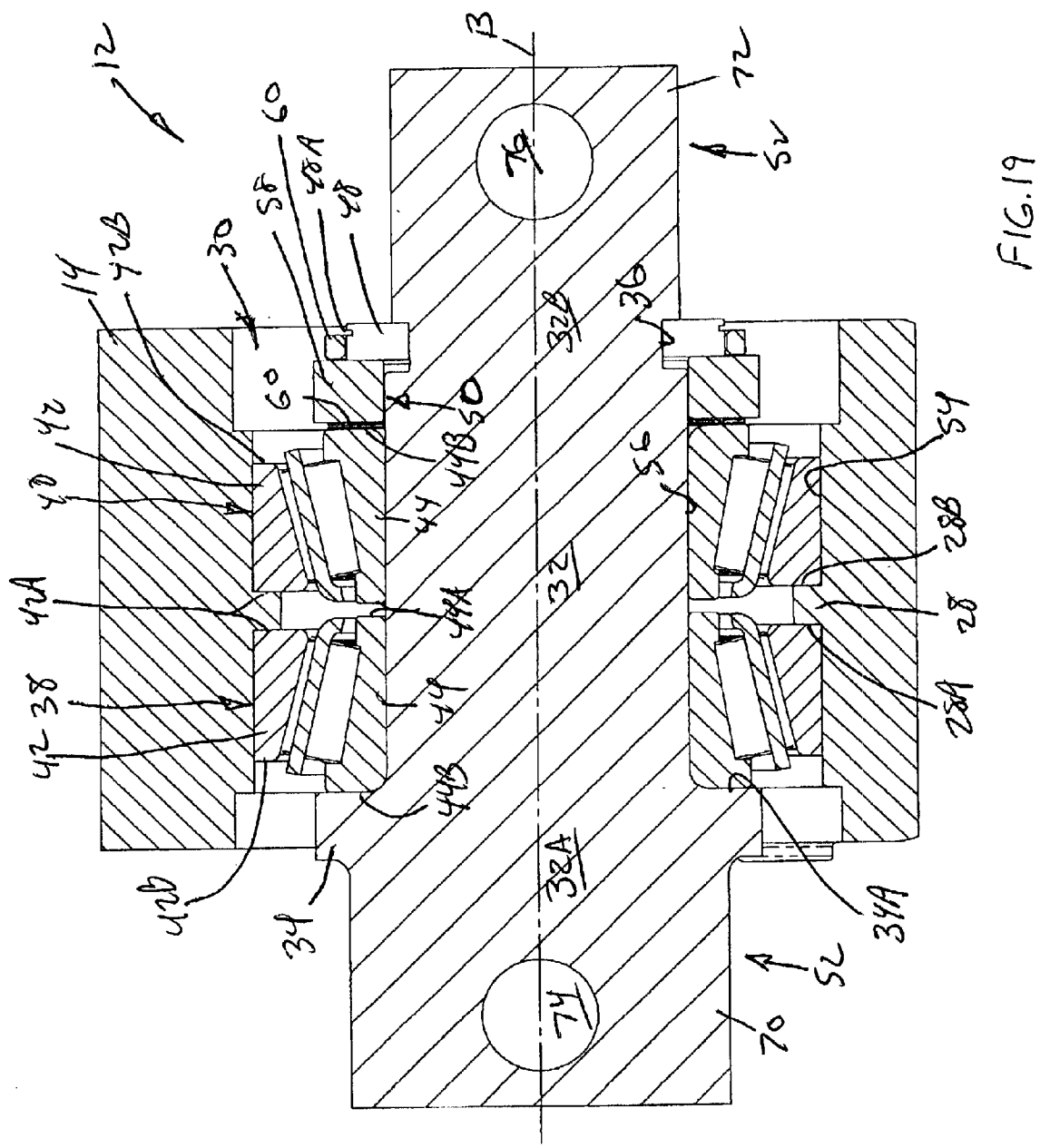
Figure 25:
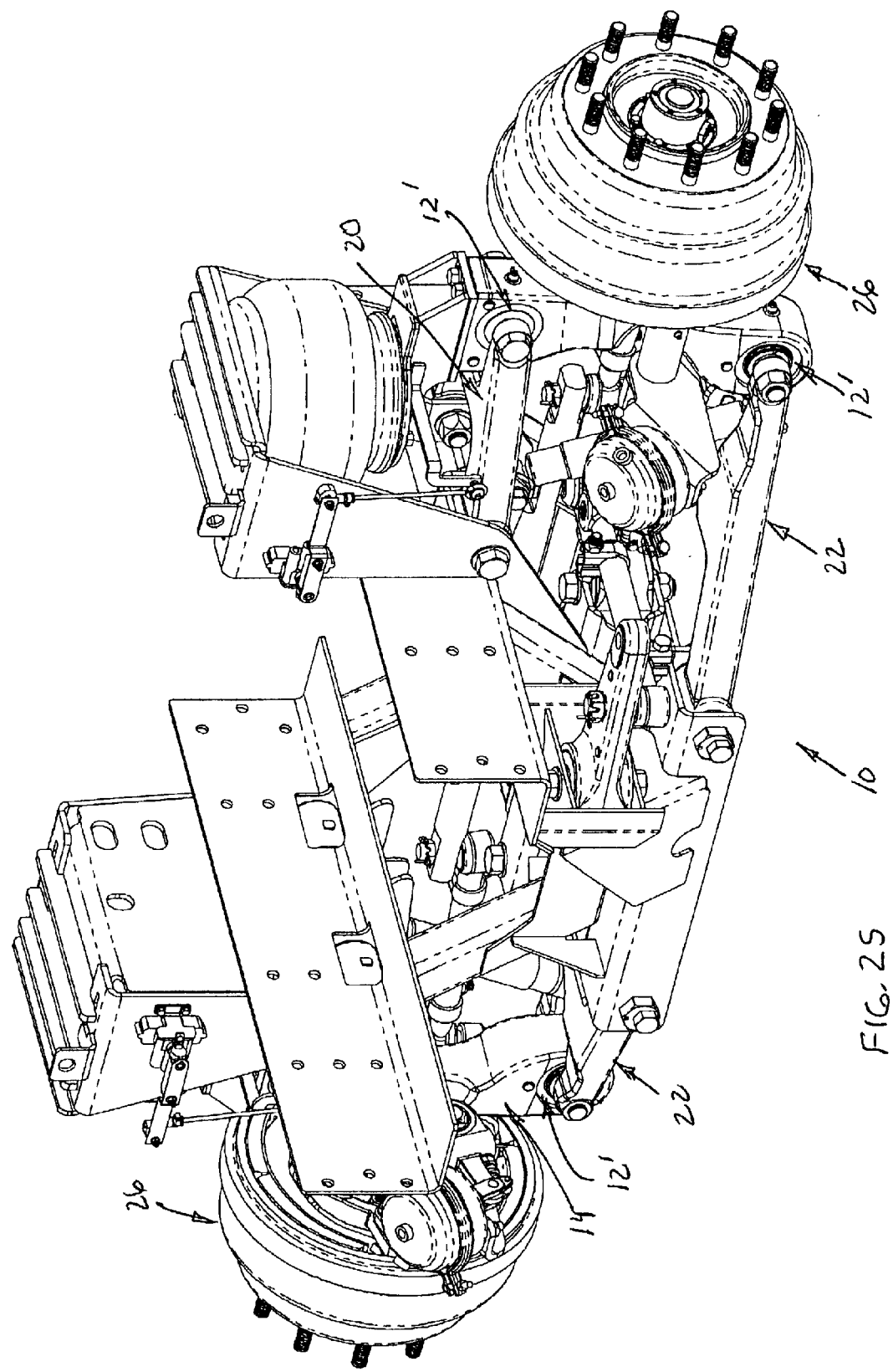
FIG. 25 is a perspective view of a steerable independent front suspension (IFS) system employing a second embodiment of a plurality of steering knuckle carrier-to-suspension arm pivotal connections of the present invention.
Figure 26:
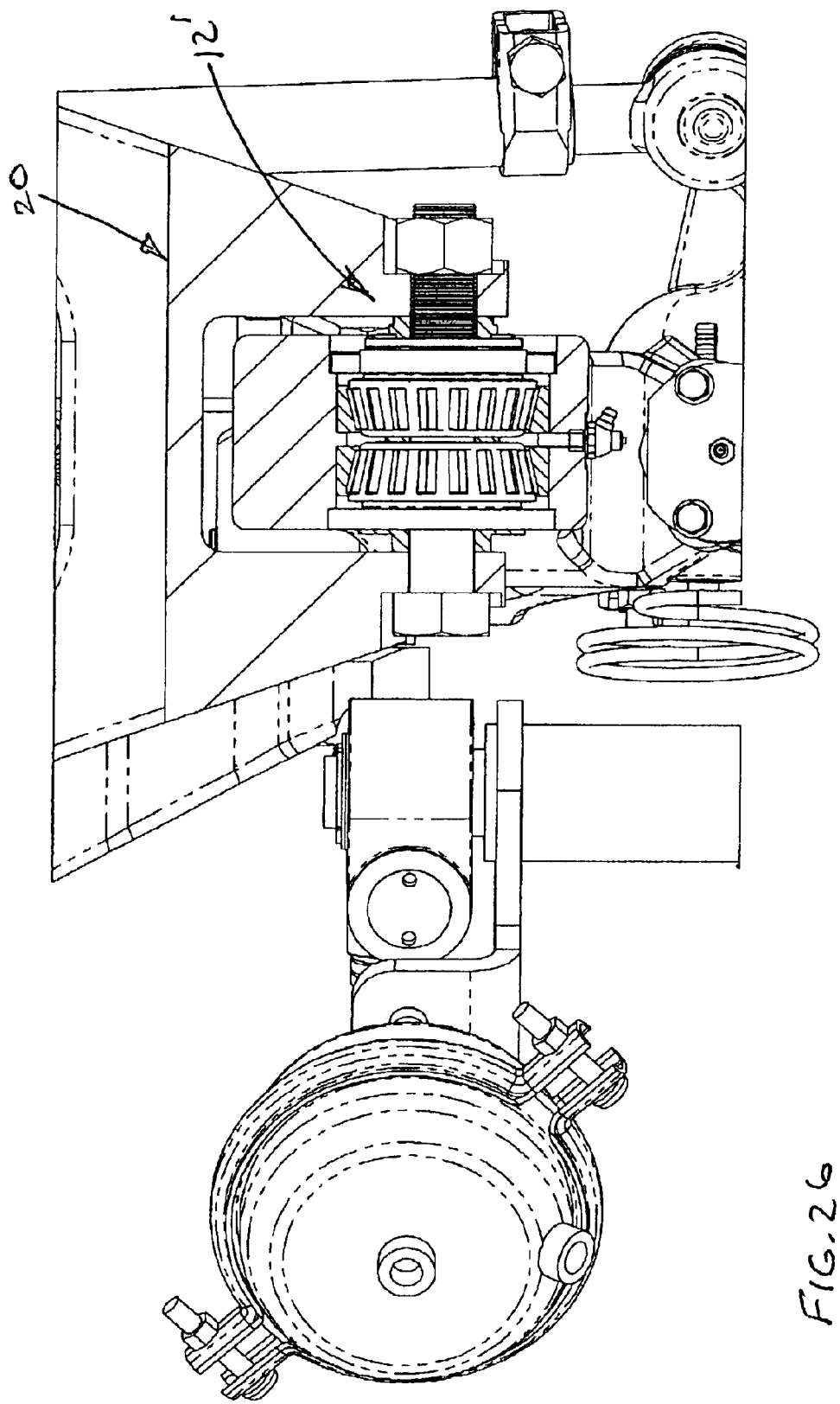
FIG. 26 is an enlarged assembled view, partly in axial sectional form, of one of the pivotal connections shown in FIG. 25.
Figure 27:
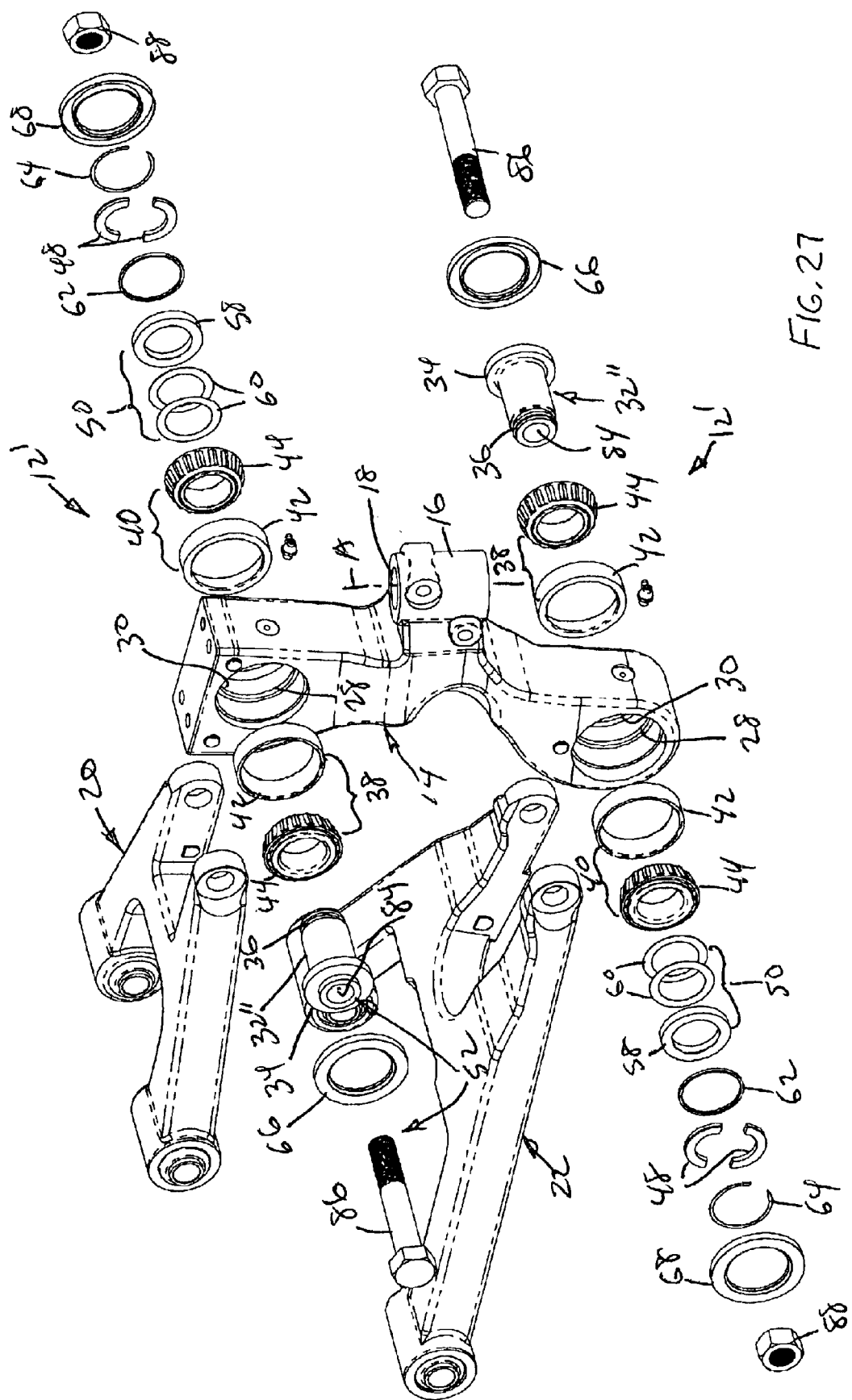
FIG. 27 is an exploded view of a steering knuckle carrier, wishbone suspension arms and the components forming preloaded bearing assemblies of the pivotal connections between the carrier and wishbone suspension arms in FIG. 26.
Figure 28:
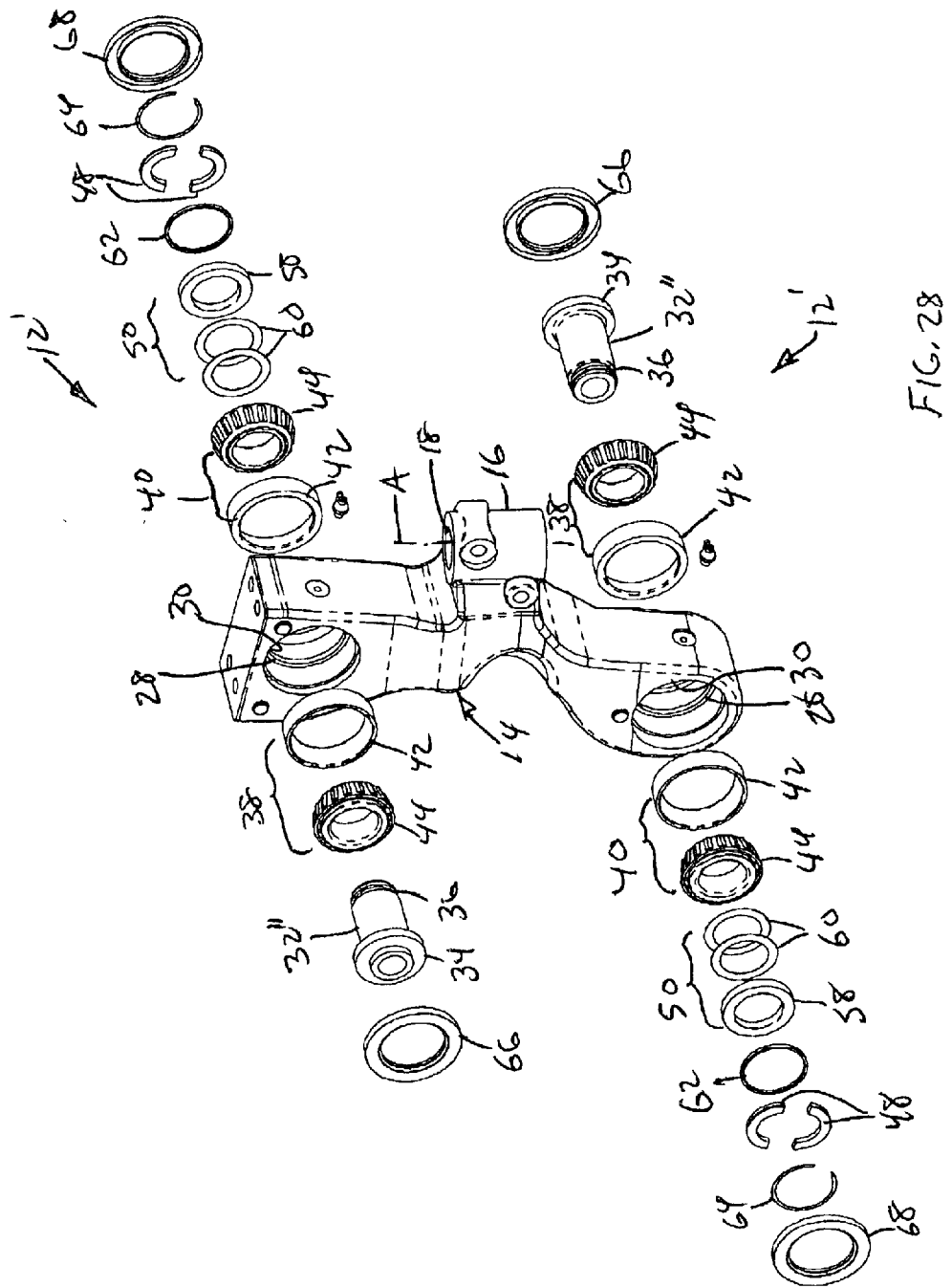
FIG. 28 is an exploded view of the same components as seen in FIG. 27 except for omission of the suspension arms.

As seen in FIGS. 19, 20 and 8, the method further includes the steps of installing the collar 62 around the retainer member 48 so as to prevent it from inadvertently coming out of the annular groove 36 of the pin 32 (see FIG. 19), installing the snap ring 64 in the outer groove 48A of the retainer member 48 outside of the collar 62 so as to prevent the collar 62 from being inadvertently removed from around the retainer member 48 (see FIG. 20), and installing one seal 66 into the bore 30 and around the flange 34 at one end 32A of the pin 32 and the other annular seal 68 into the bore 30 and around the spacer ring 58 adjacent the other end 32B of the pin 32 (see FIG. 8).

Referring now to FIGS. 25–32, there is shown the same steerable independent front suspension (IFS) system 10 as seen in FIG. 1, except now it employs a second embodiment of steering knuckle carrier-to-suspension arm pivotal connections of the present invention, being generally designated 12'. The pivotal connection 12' employes a further modified pin 32" which now has a passageway 84 formed therethrough extending between and opening at opposite ends 32A, 32B of the pin 32" for receiving a fastener 86 therethrough such that opposite ends of the fastener 86 extend beyond the opposite ends 32A, 32B of the pin 32" for fastening the opposite ends of the fastener 84, by using nuts 88, to ends of the respective suspension arms 20, 22. The mounting tabs are omitted in this embodiment. The manner of retaining the preload force in pivotal connection 12' remains the same as described above with respect to pivotal connection 12 of the first embodiment.

It is thought that the present invention and its advantages will be understood from the foregoing description and it will be apparent that various changes may be made thereto without departing from the spirit and scope of the invention or sacrificing all of its material advantages, the forms of the invention hereinbefore described being merely preferred or exemplary embodiments thereof.

I (We) claim:

1. A steering knuckle carrier-to-suspension arm pivotal connection, comprising:
   (a) an annular member centrally located along and projecting radially into a bore through a steering knuckle carrier;
   (b) an elongated pin extending through said bore and having an annular flange formed around and projecting radially outwardly from and proximate one end of said pin and an annular groove formed around and projecting radially inwardly into and proximate an opposite end of said pin;
   (c) a pair of opposing annular bearing assemblies disposed around said pin and located between said one and opposite ends thereof and having components rotatable relative to one another fitted around said pin and within said bore of said carrier on opposite sides of said annular member in said bore such that said pin is rotatable relative to said carrier, both of said annular bearing assemblies abutting opposite sides of said annular member in the bore, one of said annular bearing assemblies abutting a side of said annular flange on said pin and the other of said annular bearing assemblies being spaced from said annular groove in said pin so as to define an annular gap extending from said annular groove to said other annular bearing assembly;
   (d) a retainer member disposed in said annular groove in said pin and projecting radially outwardly beyond said pin and spaced by said annular gap from said other annular bearing assembly;
   (e) means positioned around said pin between said retainer member and said other annular bearing assembly so as to fill said annular gap in a manner that imposes a predetermined preload force on said annular bearing assemblies that causes said annular bearing assemblies to clamp therebetween said annular member in said bore of said carrier; and
   (f) means disposed at opposite ends of said pin for attaching said pin to a suspension arm.

2. The pivotal connection of claim 1 wherein said annular member is a ring-shaped segment integrally formed on a cylindrical interior surface in said carrier which defines said bore therethrough, said annular member projecting radially from said cylindrical interior surface into said bore.

3. The pivotal connection of claim 1 wherein said pin has a cylindrical exterior surface extending between said flange and said groove.

4. The pivotal connection of claim 1 wherein said components of said annular bearing assemblies are outer cups and inner races disposed in said outer cups and rotatable relative thereto, said outer cups fitted within and in contact with said cylindrical interior surface of said carrier, said inner races fitted around and in contact with said cylindrical exterior surface of said pin.

5. The pivotal connection of claim 1 wherein said retainer member is a split ring.

6. The pivotal connection of claim 1 wherein said means positioned around said pin so as to fill said gap in a manner that imposes the predetermined preload force on said annular bearing assemblies includes an annular spacer ring and a predetermined number of annular shims.

7. The pivotal connection of claim 6 further comprising:
   a collar disposed around said retainer member so as to prevent said retainer member from coming out of said annular groove of said pin.

8. The pivotal connection of claim 7 further comprising:
   a snap ring disposed in an outer groove in said retainer member outside of said collar so as to prevent said collar from being removed from around said retainer member.

9. The pivotal connection of claim 8 further comprising:
   a pair of annular seals, one of said seals being disposed in said bore and around said flange at one end of said pin and the other of said seals being disposed in said bore and around said spacer ring adjacent the other end of said pin.

10. The pivotal connection of claim 1 wherein said pin has a passageway formed therethrough extending between and opening at opposite ends of said pin for receiving a fastener therethrough such that opposite ends of the fastener extend beyond said opposite ends of said pin for fastening the opposite ends of the fastener to ends of the suspension arm.

11. The pivotal connection of claim 1 wherein said means disposed at opposite ends of said pin for attaching said pin to a suspension arm includes a pair of tabs each integrally attached to one of said opposite ends of said pin and axially protruding therefrom and having holes for receiving means to fasten said tabs to the suspension arm.

12. The pivotal connection of claim 11 wherein said pin has a longitudinal central axis and said tabs have a pair of opposite surfaces facing in opposite directions and displaced different distances away from said longitudinal central axis of said pin such that by rotating said pin about said longitudinal central axis thereof relative to said carrier and between first and second angular positions displaced from one another through one hundred eighty degrees camber of said carrier can be adjusted.

13. A steering knuckle carrier-to-suspension arm pivotal connection, comprising:
   (a) a ring shaped segment integrally provided generally centrally on a cylindrical interior surface of a first diameter defining a bore through a carrier for supporting a steering knuckle, said ring shaped segment projecting radially from said cylindrical interior surface into said bore so as to define a pair of annular surfaces on opposite sides of said ring shaped segment facing in opposite directions from one another;
   (b) an elongated pin extending through said bore and having a cylindrical exterior surface of a second diameter less than said first diameter and spaced radially inwardly from said cylindrical interior surface of said carrier, said pin also having an annular flange of a third diameter less than said first diameter and greater than said second diameter formed around and projecting radially outwardly from said pin at one of a pair of opposite ends of said cylindrical exterior surface of said pin, said pin further having an annular groove of a fourth diameter less than said second diameter formed around and projecting radially inwardly into said pin at the other of said pair of opposite ends of said cylindrical exterior surface of said pin;
   (c) a pair of opposing annular bearing assemblies disposed around said cylindrical exterior surface of said pin and having respective outer cups and inner races rotatable relative to said outer cups with said inner races being fitted around and in contact with said cylindrical exterior surface of said pin and said outer cups being fitted within and in contact with said cylindrical interior surface of said carrier such that said pin is enabled to rotate with said inner races relative to said outer cup and said carrier, said outer cups of said annular bearing assemblies having first ends adjacent to one another abutting said annular surfaces on said opposite sides of said ring shaped segment on said carrier and second ends remote from one another, said inner races of said annular bearing assemblies having first ends spaced from one another and second ends remote from one another facing in opposite directions such that said second end of said inner race of one of said annular bearing assemblies abuts a side of said annular flange on said pin and said second end of said inner race of the other of said annular bearing assemblies is spaced from said annular groove in said pin so as to define an annular gap extending from said annular groove to said second end of said inner race of said other of said annular bearing assemblies;

(d) a split ring disposed in said annular groove at said other of said opposite ends of said cylindrical exterior surface of said pin and projecting radially outwardly beyond said cylindrical exterior surface of said pin and thus spaced by said annular gap from said second end of said inner race of said other of said annular bearing assemblies;

(e) a stack of annular elements positioned around said cylindrical exterior surface of said pin between said split ring and said second end of said inner race of said other of said annular bearing assemblies so as to fill said annular gap in a manner that imposes a predetermined preload on said second ends of said inner races of said annular bearing assemblies that causes said first ends of said outer cups of said annular bearing assemblies to clamp therebetween said ring shaped segment on said carrier; and (f) means disposed at opposite ends of said pin for attaching said pin to ends of a suspension arm.

14. The pivotal connection of claim 13 wherein said stack of annular elements positioned around said pin so as to fill said gap in a manner that imposes a predetermined preload force on said annular bearing assemblies includes an annular spacer ring and a predetermined number of annular shims.

15. The pivotal connection of claim 14 wherein said annular shims are positioned around said pin between said annular spacer ring and said second end of said inner race of said other of said annular bearing assemblies.

16. The pivotal connection of claim 13 wherein said pin has a passageway formed therethrough extending between and opening at opposite ends of said pin for receiving a fastener therethrough such that opposite ends of the fastener extend beyond said opposite ends of said pin for fastening the opposite ends of the fastener to ends of the suspension arm.

17. The pivotal connection of claim 13 wherein said means disposed at opposite ends of said pin for attaching said pin to a suspension arm includes a pair of tabs each integrally attached to one of said opposite ends of said pin and axially protruding therefrom and having holes for receiving means to fasten said tabs to the suspension arm.

18. The pivotal connection of claim 17 wherein said pin has a longitudinal central axis and said tabs have a pair of opposite surfaces facing in opposite directions and displaced different distances away from said longitudinal central axis of said pin such that by rotating said pin about said longitudinal central axis thereof relative to said carrier and between first and second angular positions displaced from one another through one hundred eighty degrees the camber of said carrier can be adjusted.

19. A method of assembling and preloading a steering knuckle carrier-to-suspension arm pivotal connection, comprising the steps of:

(a) providing an annular member centrally located along and projecting radially into a bore through a steering knuckle carrier;

(b) providing an elongated pin having an annular flange formed around and projecting radially outwardly from and proximate to one end of the pin and an annular groove formed around and projecting radially inwardly into and proximate to an opposite end of the pin;

(c) placing the pin and a pair of relatively rotatable annular bearing assemblies within the bore such that the bearing assemblies are disposed around the pin between the flange and groove thereof in abutting relationship with opposite sides of the annular member in the bore with one of the bearing assemblies also abutting the flange of the pin and the other of the bearing assemblies being spaced from the groove of the pin so as to define a gap therebetween and with the bearing assemblies having respective components rotatable relative to one another and respectively being fitted around and in contact with the pin and within and in contact with the bore of the carrier such that said pin is enabled to rotate relative to the carrier;

(d) installing a spacer ring about the pin adjacent to the other bearing assembly and the groove in the pin;

(e) applying a predetermined preload force against the spacer ring in the direction of the bearing assemblies so as slide the spacer ring toward the other bearing assembly and away from the groove;

(f) installing a retainer ring in the annular groove;

(g) measuring the width along the pin of a space left between the spacer ring and retainer ring and predetermining the number of annular shims it takes to fill the space;

(h) removing the predetermined preload force and the retainer ring;

(i) installing the predetermined number of annular shims along with the spacer ring around the pin in the gap between the annular groove in the pin and the other bearing assembly;

(j) reapplying the predetermined preload force against the spacer ring and annular shims in the direction of the bearing assemblies so as slide the spacer ring and annular shims toward the other bearing assembly and away from the groove; and (k) reinstalling the retainer ring in the groove so as to retain the spacer ring and annular shims around the pin so as to fill the gap in a manner that imposes the predetermined preload on the bearing assemblies that causes the bearing assemblies to clamp therebetween the annular member in the bore of the carrier.

20. The method of claim 19 further comprising the step of:
providing each of the bearing assemblies with an outer cup and an inner race rotatable relative to the outer cup.

21. The method of claim 20 wherein said placing the pin and bearing assemblies within the bore includes, first, installing the outer cups of the bearing assemblies into the bore at opposite sides of the annular member.

22. The method of claim 21 wherein said placing the pin and bearing assemblies within the bore further includes, next, installing the pin with the inner race of the one bearing assembly being disposed thereon into the bore.

23. The method of claim 22 wherein said placing the pin and bearing assemblies within the bore still further includes, last, installing the inner race of the other bearing assembly in the bore and around the pin.

24. The method of claim 19 further comprising the step of:
installing a collar around the retainer ring so as to prevent the retainer ring from coming out of the annular groove of the pin.

25. The method of claim 24 further comprising the step of:
installing a snap ring in an outer groove of the retainer ring outside of the collar so as to prevent the collar from being removed from around the retainer ring.

26. The method of claim 25 further comprising the step of:
installing one of a pair of annular seals into the bore and around the flange at one end of the pin and the other of the pair of annular seals into the bore and around the spacer ring adjacent the other end of the pin.

* * * * *